US008826046B2

(12) United States Patent
Lu et al.

(10) Patent No.: US 8,826,046 B2
(45) Date of Patent: Sep. 2, 2014

(54) LIGHT FIXTURE MONITORING-CONTROLLING SYSTEM AND METHOD FOR CONTROLLING LIGHT INTENSITY BASED ON A LIGHT FIXTURE ADAPTER PROGRAM LOADED FROM A WEB-SERVER

(71) Applicant: Advanergy, Inc., Winnetka, CA (US)

(72) Inventors: Jin Lu, Oak Park, CA (US); Todd Scott Kelly, Winnetka, CA (US); Lee Cheung, Thousand Oak, CA (US)

(73) Assignee: Advanergy, Inc., Winnetka, CA (US)

( * ) Notice: Subject to any disclaimer, the term of this patent is extended or adjusted under 35 U.S.C. 154(b) by 0 days.

(21) Appl. No.: 13/844,491

(22) Filed: Mar. 15, 2013

(65) Prior Publication Data
US 2013/0231796 A1  Sep. 5, 2013

Related U.S. Application Data

(63) Continuation-in-part of application No. 13/644,995, filed on Oct. 4, 2012, now Pat. No. 8,583,955, and a continuation-in-part of application No. 13/840,022, filed on Mar. 15, 2013, now Pat. No. 8,769,327, and a continuation-in-part of application No. 13/645,080, filed on Oct. 4, 2012, now Pat. No. 8,443,071, which is a continuation-in-part of application No. 13/645,044, filed on Oct. 4, 2012, now Pat. No. 8,761,050, which is a continuation-in-part of application No. 13/644,795, filed on Oct. 4, 2012, now Pat. No. 8,478,450, which is a continuation-in-part of application No. PCT/US2012/058788, filed on Oct. 4, 2012, which is a continuation-in-part of application No. PCT/US2012/058781, filed on Oct. 4, 2012, which is a continuation-in-part of application No. PCT/US2012/058771, filed on Oct. 4, 2012, which is a continuation-in-part of application No. PCT/US2012/058761, filed on Oct. 4, 2012.

(60) Provisional application No. 61/542,811, filed on Oct. 4, 2011, provisional application No. 61/555,099, filed on Jun. 4, 2012, provisional application No. 61/698,288, filed on Sep. 7, 2012, provisional application No. 61/667,477, filed on Jul. 3, 2012, provisional application No. 61/661,100, filed on Jun. 18, 2012.

(51) Int. Cl.
*G06F 1/00* (2006.01)
*G05D 23/00* (2006.01)

(52) U.S. Cl.
USPC ............................. 713/300; 700/295

(58) Field of Classification Search
USPC ........................ 713/300, 324, 340
See application file for complete search history.

(56) References Cited

U.S. PATENT DOCUMENTS 3,955,463 A  5/1976  Hoehn
4,105,862 A  8/1978  Hoehn
(Continued)

OTHER PUBLICATIONS (Author Unknown); "Simplest Possible WiFi Remote Power Switch"; AVS (Forum); Sep. 15, 2011; http://www.avsforum.com/avs-vb/showthread.php?p=20977417; 5 pp.

(Continued)

*Primary Examiner* — Thomas Lee
*Assistant Examiner* — Phil Nguyen
(74) *Attorney, Agent, or Firm* — David W. Carstens; Kevin K. Klughart; Carstens & Cahoon, LLP

(57) ABSTRACT

A light fixture monitoring/control system/method allowing a lamp associated with a lighting fixture to be controlled in response to localized lighting fixture sensor inputs and/or remote wireless commands is disclosed. The system utilizes a light fixture adapter (LFA) as a dimming control and monitoring interface between a light fixture and the lamp installed in the LFA. Dimming control is directed by a computing device based on a LFA program (LFAP) that analyzes information from one or more sensors integrated within the LFA. The LFA supports a web-based browser interface and a wireless communication link allowing remote users to define the LFAP and/or directly control lamp dimming and/or access data from LFA sensors. The LFA permits low-cost retrofitting of existing light fixtures with "smart" networked lighting controls that may incorporate advanced spatially diverse security monitoring functions including audio and/or video surveillance.

30 Claims, 16 Drawing Sheets

(56) References Cited

U.S. PATENT DOCUMENTS

| | | | |
|---|---|---|---|
| 4,188,854 A | 2/1980 | Hoehn | |
| 4,297,525 A | 10/1981 | Bowden, Jr. | |
| 4,304,957 A | 12/1981 | Slater et al. | |
| 4,366,343 A | 12/1982 | Slater et al. | |
| 4,389,535 A | 6/1983 | Slater et al. | |
| 4,414,427 A | 11/1983 | Slater et al. | |
| 4,424,406 A | 1/1984 | Slater et al. | |
| 6,831,449 B2 | 12/2004 | Nishida et al. | |
| 7,139,890 B2* | 11/2006 | Moran et al. | 711/163 |
| 7,573,208 B2 | 8/2009 | Newman, Jr. | |
| 7,772,802 B2 | 8/2010 | Manico et al. | |
| 8,204,990 B1 | 6/2012 | Avery et al. | |
| 8,278,838 B2 | 10/2012 | Shen | |
| 2003/0167415 A1 | 9/2003 | Odaohhara et al. | |
| 2004/0066171 A1 | 4/2004 | Mori | |
| 2004/0193929 A1 | 9/2004 | Kuranuki | |
| 2004/0243826 A1 | 12/2004 | Wang | |
| 2006/0050464 A1 | 3/2006 | Von Arx et al. | |
| 2006/0052905 A1 | 3/2006 | Pfingsten et al. | |
| 2006/0155993 A1* | 7/2006 | Busboon | 713/169 |
| 2006/0230298 A1 | 10/2006 | Bohlinger et al. | |
| 2009/0295232 A1 | 12/2009 | McGinley et al. | |
| 2010/0019718 A1 | 1/2010 | Salasoo et al. | |
| 2010/0164284 A1 | 7/2010 | Lee et al. | |
| 2010/0164397 A1 | 7/2010 | Shen | |
| 2011/0051414 A1* | 3/2011 | Bailey et al. | 362/235 |
| 2012/0007511 A1* | 1/2012 | Choong et al. | 315/152 |
| 2012/0112654 A1* | 5/2012 | Choong et al. | 315/291 |
| 2012/0136485 A1 | 5/2012 | Weber et al. | |
| 2012/0159210 A1 | 6/2012 | Hosaka | |
| 2012/0242688 A1 | 9/2012 | Boyle | |

OTHER PUBLICATIONS (Author Unknown); "A Wi-Fi Controlled Power Outlet From iPhone?"; Yahoo Answers; Apr. 1, 2011; http://answers.yahoo.com/question/index?qid=20110401143408AAPQerm; 2 pp.

(Author Unknown); "Control Home Lights Via Internet With Your Computer or Wi-Fi Handheld Devices"; Squidoo; At least as early as Apr. 5, 2012; http://www.squidoo.com/control-home-lights-via-internet; 7 pp.

Harmony Gateway—Multi-Protocol HAN Gateway/Controller—Model #5010M; SimpleHomeNet; At least as early as Oct. 3, 2012; http://www.simplehomenet.com/proddetail.asp?prod=HarmonyGateway; 1 p.

"Battery Charging Tutorial"; ChargingChargesr.com; [Date]; http://www.chargingchargers.com; tutorials/charging.html; 4 pp.

"Battery Chargers and Charging Methods"; Electropaedia; [Date]; http://www.mpoweruk.com; chargers.htm; 8 pp.

"A bit about charging batteries"; from the XJ Electrical Help! Page; http://www.geocities.com/MotorCity/Speedway/7795; 1998 Aaron Berg; seca750@geocities.com.

Jack Shandle; "Smart Lighting Technologies Feature CFL Dimming, Wireless Control"; e-ContentWorks for Convergence Promotions LLC; http://www.digikey.com/us/en/techzone/lighting/resources/articles/smart-lighting-technologies.html.

Shandle, Jack—"Smart Lighting Technologies Feature CFL Dimming, Wireless Control", www.digikey.com/us/en/techzone/lighting/resources/articles/smart-lighting-technologies.html, Jun. 4, 2013, 4 pp.

U.S. Appl. No. 61/661,100, entitled "Power Control System and Method", filed Jun. 18, 2012.

U.S. Appl. No. 61/698,288, entitled "Data Server System and Method", filed Sep. 7, 2012.

(Author Unknown); "Battery Life (and Death)"; Electropaedia; At least as early as Oct. 4, 2011; http://www.mpoweruk.com/life.htm; 8 pp.

(Author Unknown); "Charging Lithium-ion"; Battery University; At least as early as Nov. 10, 2010; http://batteryuniversity.com/index.php/learn/article/charging_lithium_ion_batteries; 32 pp.

(Author Unknown); "Battery Management System (BMS)"; Electropaedia; At least as early as Oct. 4, 2011; http://www.mpoweruk.com/bms.htm#smartbats (smart battery); 8 pp.

(Author Unknown); "How to Prolong Lithium-based Batteries"; Battery University; At least as early as Oct. 21, 2010; http://batteryuniversity.com/learn/article/how_to_prolong_lithium_based_batteries; 34 pp.

Tarandeep Singh; "Secrets for Prolonging Lithium-based Battery Life"; Geeknizer; May 12, 2009; http://geeknizer.com/secrets-for-prolonging-lithium-based-batteries/#ixzz1Zju0wY6H; 4 pp.

(Author Unknown); "How to Enable/Disable Battery Care Function on Sony Vaio to Improve Battery Life"; Digital Pbk (Forum); At least as early as Aug. 12, 2011; http://digitalpbk.com/hardware/sony-vaio-enable-battery-care-function-improve-battery-life; 4 pp.

(Author Unknown); "Wi-Fi Light Control"; Wi-Fi Planet (Forum); Jan. 31, 2009; http://forums.wi-fiplanet.com/showthread.php?t=9954; 5 pp.

(Author Unknown); "Why Hasn't Anyone Made Any WiFi Light Switches or Power Sockets?"; Wi-Fi Planet (Forum); Dec. 29, 2005; http://forums.wi-fiplanet.com/showthread.php?t=5584; 4 pp.

* cited by examiner

FIG. 1
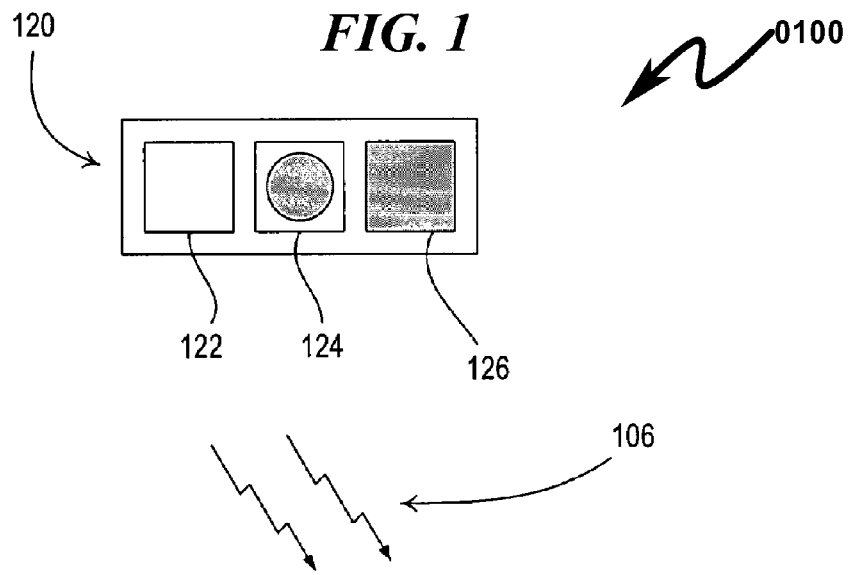
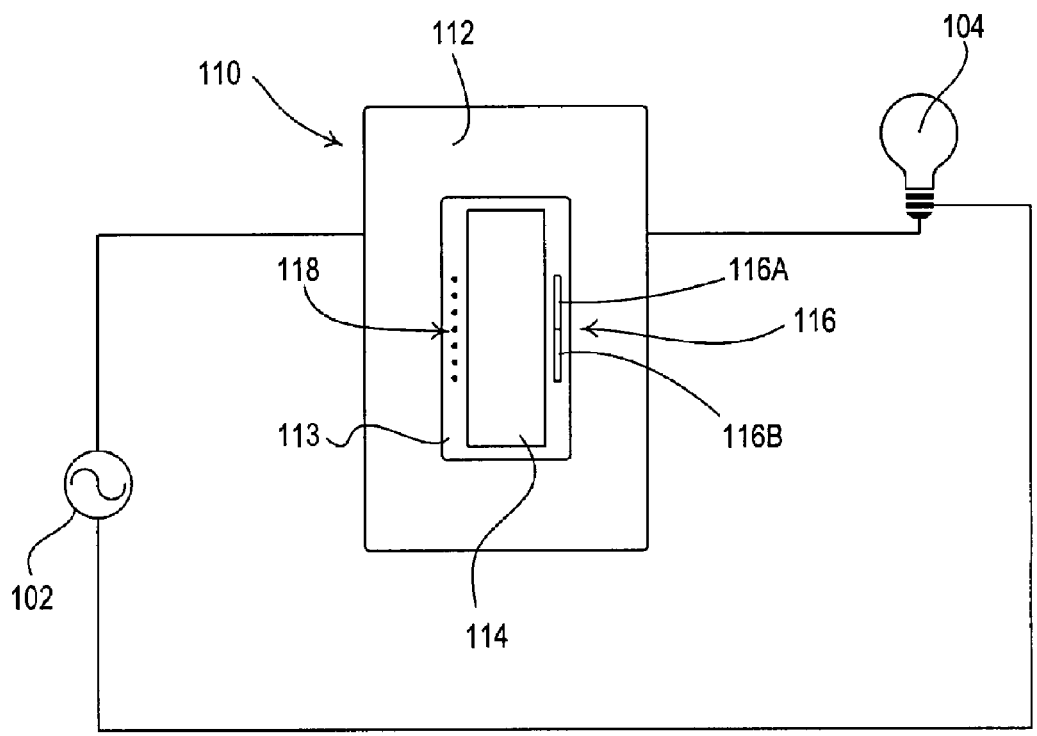
*Prior Art*
*U.S. Patent 7,573,208*

LIGHT FIXTURE MONITORING-CONTROLLING SYSTEM AND METHOD FOR CONTROLLING LIGHT INTENSITY BASED ON A LIGHT FIXTURE ADAPTER PROGRAM LOADED FROM A WEB-SERVER

CROSS REFERENCE TO RELATED APPLICATIONS

U.S. Utility Patent Applications

This application claims benefit under 35 U.S.C. §120 and incorporates by reference United States Utility Patent Application for BATTERY CHARGER MANAGEMENT SYSTEM AND METHOD by inventors Jin (nmn) Lu and Todd Scott Kelly, filed electronically with the USPTO on Mar. 15, 2013, with Ser. No. 13/840,022.

This application claims benefit under 35 U.S.C. §120 and incorporates by reference United States Utility patent application for DATA SERVER SYSTEM AND METHOD by inventors Jin (nmn) Lu and Todd Scott Kelly, filed electronically with the USPTO on Oct. 4, 2012, with Ser. No. 13/645,080.

This application claims benefit under 35 U.S.C. §120 and incorporates by reference United States Utility patent application for NETWORK INTEGRATION SYSTEM AND METHOD by inventors Jin (nmn) Lu and Todd Scott Kelly, filed electronically with the USPTO on Oct. 4, 2012, with Ser. No. 13/645044.

This application claims benefit under 35 U.S.C. §120 and incorporates by reference United States Utility patent application for BATTERY MANAGEMENT SYSTEM AND METHOD by Jin (nmn) Lu, Todd Scott Kelly, and Lee (nmn) Cheung, filed electronically with the USPTO on Oct. 4, 2012, with Ser. No. 13/644,995.

This application claims benefit under 35 U.S.C. §120 and incorporates by reference United States Utility patent application for POWER CONTROL SYSTEM AND METHOD by inventors Jin (nmn) Lu, Todd Scott Kelly, and Lee (nmn) Cheung, filed electronically with the USPTO on Oct. 4, 2012, with Ser. No. 13/644795.

PCT Patent Applications

This application claims benefit under 35 U.S.C. §120 and incorporates by reference PCT Patent Application for DATA SERVER SYSTEM AND METHOD by inventors Jin (nmn) Lu and Todd Scott Kelly, filed electronically with the USPTO on Oct. 4, 2012, with serial number PCT/US12/58788.

This application claims benefit under 35 U.S.C. §120 and incorporates by reference PCT Patent Application for NETWORK INTEGRATION SYSTEM AND METHOD by inventors Jin (nmn) Lu and Todd Scott Kelly, filed electronically with the USPTO on Oct. 4, 2012, with serial number PCT/US12/58781.

This application claims benefit under 35 U.S.C. §120 and incorporates by reference PCT Patent Application for BATTERY MANAGEMENT SYSTEM AND METHOD by Jin (nmn) Lu, Todd Scott Kelly, and Lee (nmn) Cheung, filed electronically with the USPTO on Oct. 4, 2012, with serial number PCT/US12/58771.

This application claims benefit under 35 U.S.C. §120 and incorporates by reference PCT Patent Application for POWER CONTROL SYSTEM AND METHOD by inventors Jin (nmn) Lu, Todd Scott Kelly, and Lee (nmn) Cheung, filed electronically with the USPTO on Oct. 4, 2012, with serial number PCT/US12/58761.

U.S. Provisional Patent Applications

This application claims benefit under 35 U.S.C. §119 and incorporates by reference United States Provisional Patent Application for DATA SERVER SYSTEM AND METHOD by inventors Jin (nmn) Lu and Todd Scott Kelly, filed electronically with the USPTO on Sep. 7, 2012, with Ser. No. 61/698,288.

This application claims benefit under 35 U.S.C. §119 and incorporates by reference U.S. Provisional Patent Application for NETWORK INTEGRATION SYSTEM AND METHOD by inventors Jin (nmn) Lu and Todd Scott Kelly, filed electronically with the USPTO on Jul. 3, 2012, with Ser. No. 61/667,477.

This application claims benefit under 35 U.S.C. §119 and incorporates by reference U.S. Provisional Patent Application for POWER CONTROL SYSTEM AND METHOD by inventors Jin (nmn) Lu, Todd Scott Kelly, and Lee (nmn) Cheung, filed electronically with the USPTO on Jun. 18, 2012, with Ser. No. 61/661,100.

This application claims benefit under 35 U.S.C. §119 and incorporates by reference United States Provisional Patent Application for BATTERY MANAGEMENT SYSTEM AND METHOD by Jin (nmn) Lu, Todd Scott Kelly, and Lee (nmn) Cheung, filed electronically with the USPTO on Jun. 4, 2012, with Ser. No. 61/655,099.

This application claims benefit under 35 U.S.C. §119 and incorporates by reference United States Provisional Patent Application for SMART BATTERY CONTROLLER by inventor Jin (nmn) Lu, filed electronically with the USPTO on Oct. 4, 2011, with Ser. 61/542,811.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for remote control of lighting systems. Specifically, the present invention attempts to remotely control lighting systems and the like over the Internet without the need for changes in wiring infrastructure for the lighting fixture.

PRIOR ART AND BACKGROUND OF THE INVENTION

Prior Art Overview (0100)-(0400)

Putting a switch and/or a dimmer in a light bulb socket adapter as shown in FIG. 1 (0100)-FIG. 4 (0400) is a known practice. U.S. Pat. No. 7,573,208 (METHOD OF PROGRAMMING A LIGHTING PRESET FROM A RADIO-FREQUENCY REMOTE CONTROL) and U.S. Pat. No. 8,278,838 (DIMMER DEVICE WITH FEEDBACK FUNCTION) and the references mentioned therein discuss such a device. The socket adaptor (as generally depicted in FIG. 4 (0400)) has one end screwed into a standard light bulb socket, and the other end is a standard receptacle for a light bulb to screw in. The middle part houses the control logic that can turn on and off and dim the light bulb by regulating the current. The light bulbs can be of any type and include incandescent bulbs, CFL, and LED-based lamps.

Deficiencies in the Prior Art

The prior art as detailed above suffers from the following deficiencies:
- Prior art dimmer systems cannot be controlled from ubiquitous Internet.
- Prior art dimmer systems cannot work with other home devices (sensors in particular) as a coordinated system.
- Prior art dimmer systems cannot work in a coordinated fashion to form security networks.
- Prior art dimmer systems cannot support customized sensor modules.
- Prior art dimmer systems cannot support localized autonomous intelligence that reacts to local sensor conditions without remote control.
- Prior art dimmer systems cannot be individually aggregated into a homogeneous intelligent network.

While some of the prior art may teach some solutions to several of these problems, the core issue of remotely controlling lighting systems over the Internet has not been addressed by the prior art.

OBJECTIVES OF THE INVENTION

Accordingly, the objectives of the present invention are (among others) to circumvent the deficiencies in the prior art and affect the following objectives:

(1) Provide for a light fixture monitoring/control system and method that can be controlled from ubiquitous Internet.
(2) Provide for a light fixture monitoring/control system and method that can work with other home devices (sensors in particular) as a coordinated system.
(3) Provide for a light fixture monitoring/control system and method that can work in a coordinated fashion to form security networks.
(4) Provide for a light fixture monitoring/control system and method that can support customized sensor modules.
(5) Provide for a light fixture monitoring/control system and method that can support localized autonomous intelligence that reacts to local sensor conditions without remote control.
(6) Provide for a light fixture monitoring/control system and method that can be individually aggregated into a homogeneous intelligent network.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview (0500)

The present invention describes a product that allows consumers to control (turn on and off and dim) light bulbs (and associated lamp fixtures) anywhere at home or away via an Internet-capable device (e.g., a smartphone, a tablet, or a laptop). It also allows the light bulb control to work with other devices in the same sub-network. The present invention embeds these control functions within the light fixture. It is non-intrusive, secure, and blended well with consumers' home network.

An overview of the system is depicted in FIG. 5 (0500) wherein the system comprises a light fixture adapter (LFA) comprising:
 (a) source electrical input connector (SEIC) (0511); and
 (b) sink electrical output connector (SEOC) (0512);
 (c) lamp dimmer control (LDC) (0513);
 (d) integrated computing device (ICD) (0514);
 (e) light fixture adapter sensor (LFAS) (0515); and
 (f) wireless communication interface (WCI) (0516);
 wherein
 the LDC is configured to control the flow of electrical current from the SEIC to the SEOC under direction of the ICD;
 the ICD is configured to monitor the LFAS;
 the ICD is configured to control the LDC in response to inputs from the LFAS;
 the ICD is configured to monitor the WCI;
 the ICD is configured to control the LDC in response to inputs from the WCI;
 the ICD is configured with a web-browser interface (WBI) (0517) permitting remote monitoring of the LFAS via the WCI;
 the ICD is configured with a web-browser interface (WBI) (0517) permitting remote control of the LDC via the WCI;
 the ICD is configured to execute instructions stored in a lamp fixture adapter program (LFAP) (0518);
 the LFAP is configured to allow local control and monitoring of the LDC in response to inputs from the LFAS;
 the LFAP is configured to allow local control and monitoring of the LFAS in response to inputs from the WCI;
 the LFAP is configured to allow the LFAS to be monitored and controlled by the web-browser interface;
 the LFAP is configured to allow reporting of LFAS detected events to the WCI; and
 the LFAP is configured to be remotely programmable via the WCI via the web-browser interface.

Within this context the WBI and ICD may be configured to execute software read from a computer readable medium (0519). Furthermore, the system anticipates that mobile communication devices (MCD) (0520) running applications read from a computer readable medium (0529) may also be used as a remote control and/or web interface for the system.

Method Overview (0600)

The present invention system may be utilized in the context of an overall light fixture monitoring/control method, wherein the light fixture monitoring/control system described previously is controlled by a method having the following steps:
(1) Determining if the computer network is available, and if not, proceeding to step (5) (0601);
(2) Connecting to the computer network (0602);
(3) Establishing a web-based monitoring and control interface (0603);
(4) Loading the LFAP from the web-server based on a user configuration setup (0604);
(5) Executing LFAP instructions on the ICD to monitor the LFAS and control the LDC (0605);
(6) Determining if a LFAS event has occurred and if not, proceeding to step (8) (0606);
(7) Reporting the event and/or sending data to a web-based remote interface (0607);
(8) Determining if LDC control is required by a local or remote control instruction, and if not, proceeding to step (1) (0608);
(9) Executing a dimming instruction protocol on the LDC based on LFAS input and proceeding to step (1) (0609).

Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein:

FIG. 1 illustrates a prior art light fixture switching system as taught by U.S. Pat. No. 7,573,208;

DESCRIPTION OF THE PRESENTLY PREFERRED EXEMPLARY EMBODIMENTS

Figure 2:
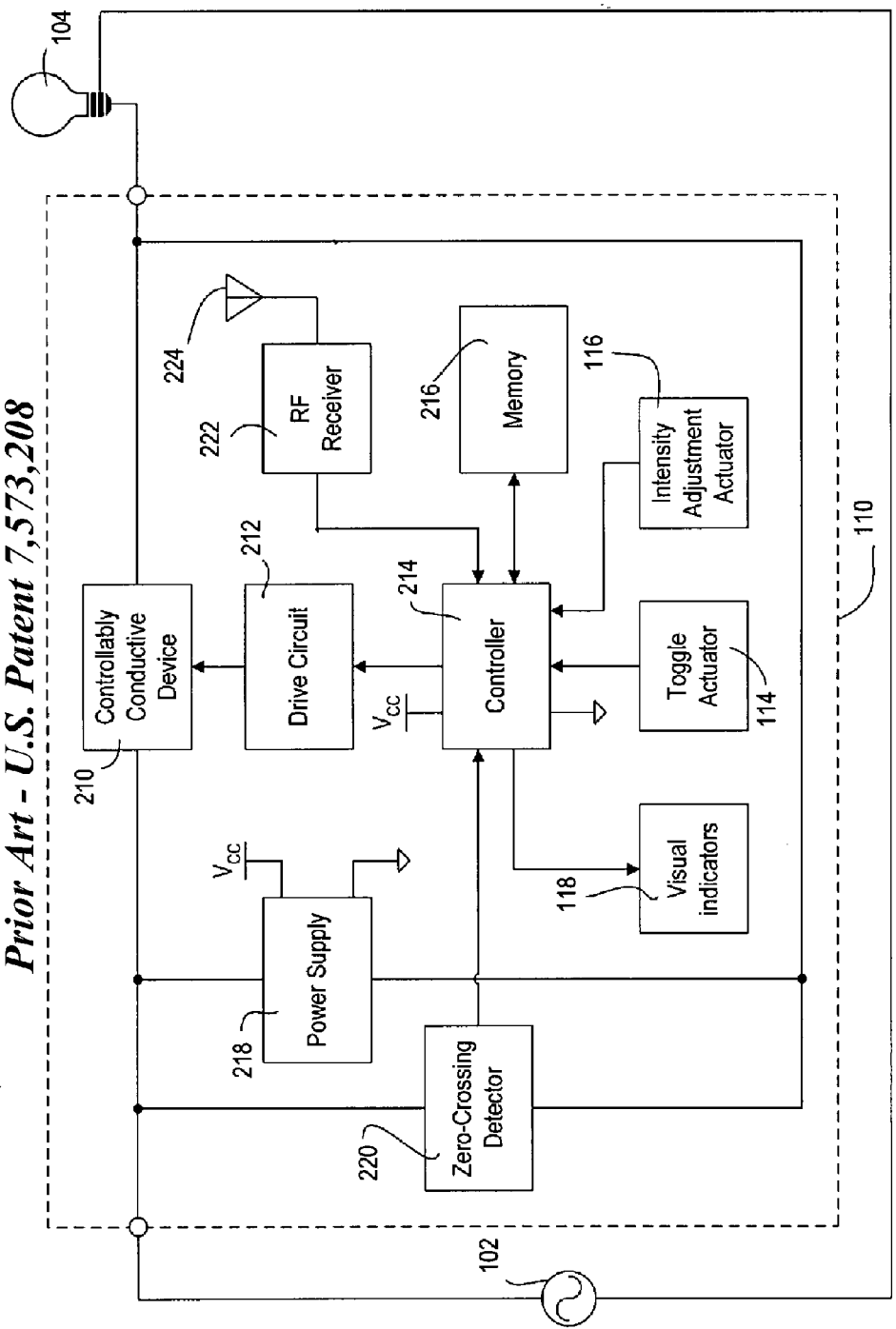
FIG. 2 illustrates a prior art light fixture switching receiver/switching system as taught by U.S. Pat. No. 7,573,208.
Figure 3:
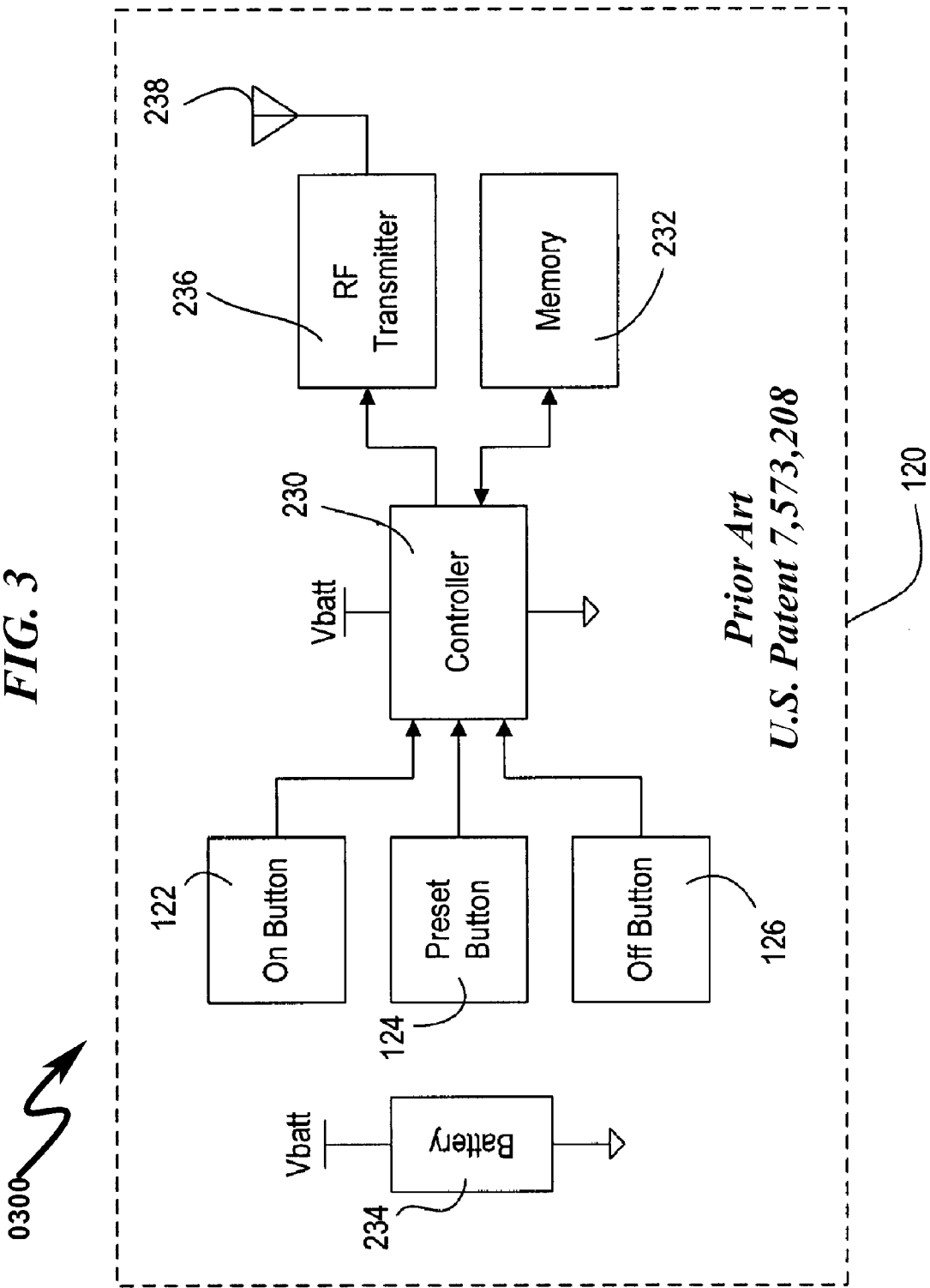
FIG. 3 illustrates a prior art light fixture switching transmitter/control system as taught by U.S. Pat. No. 7,573,208.
Figure 4:
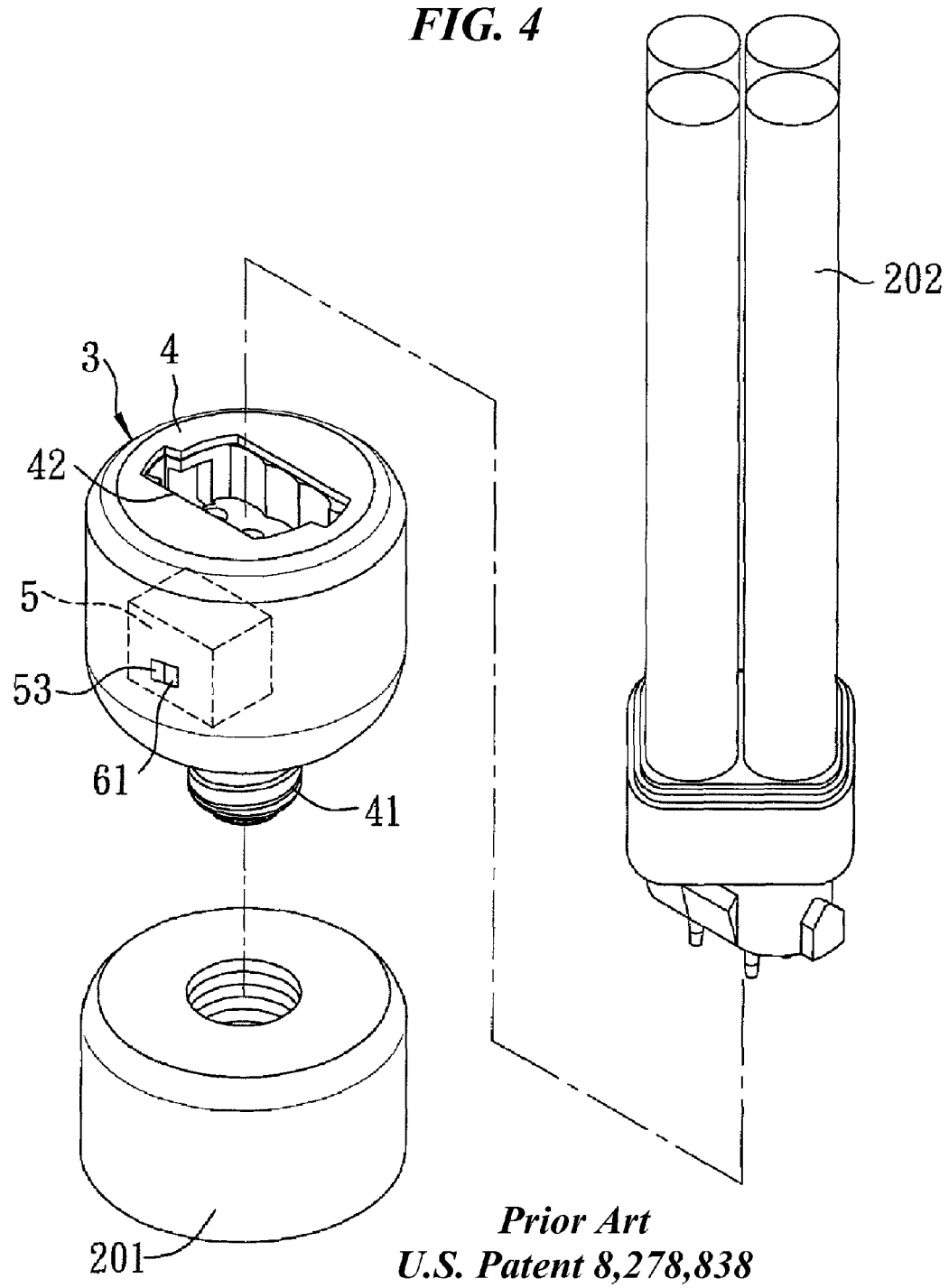
FIG. 4 illustrates a prior art light fixture switching application context as taught by U.S. Pat. No. 8,278,838.
Figure 5:
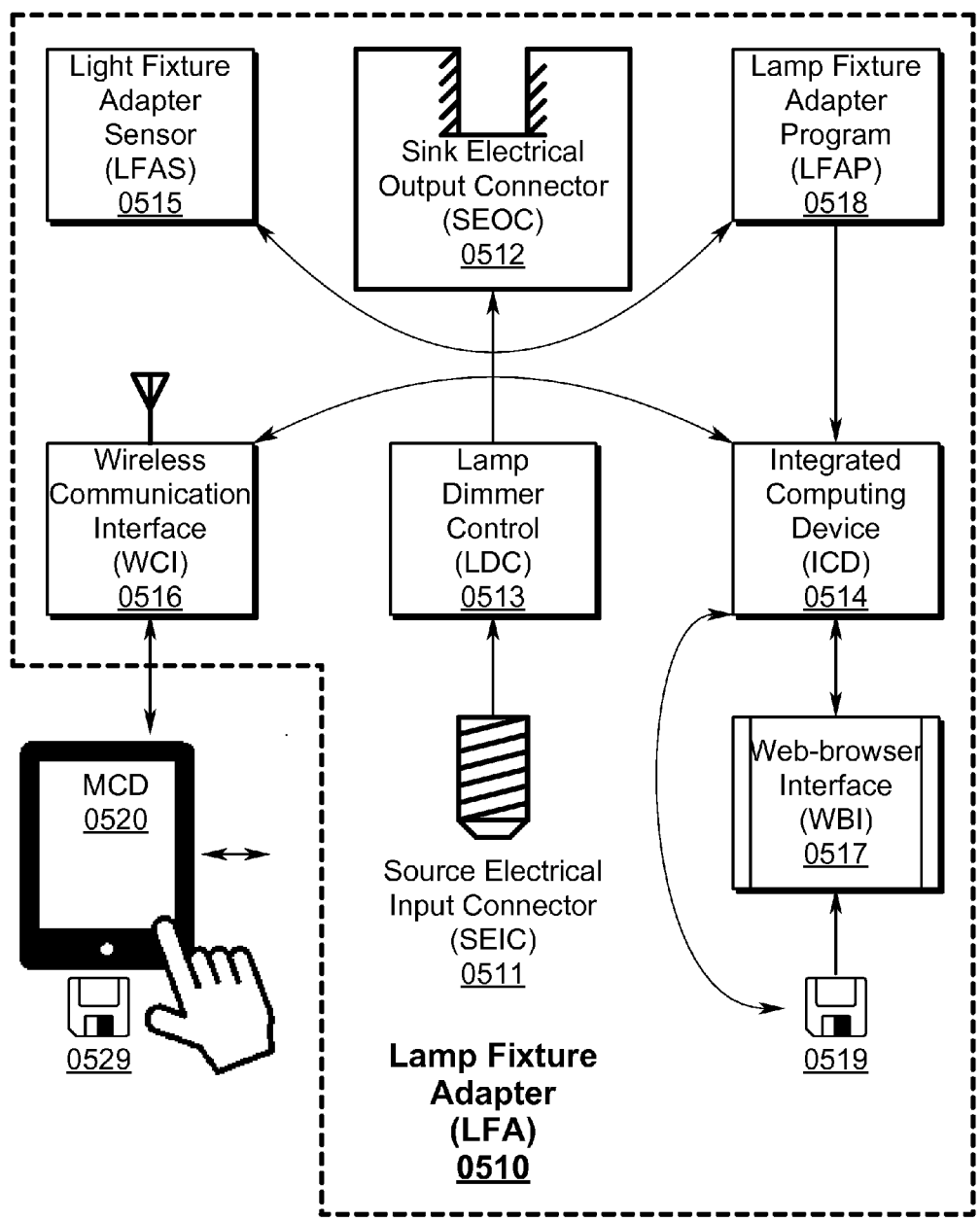
FIG. 5 illustrates a system block overview diagram describing a presently preferred embodiment of the present invention.
Figure 6:
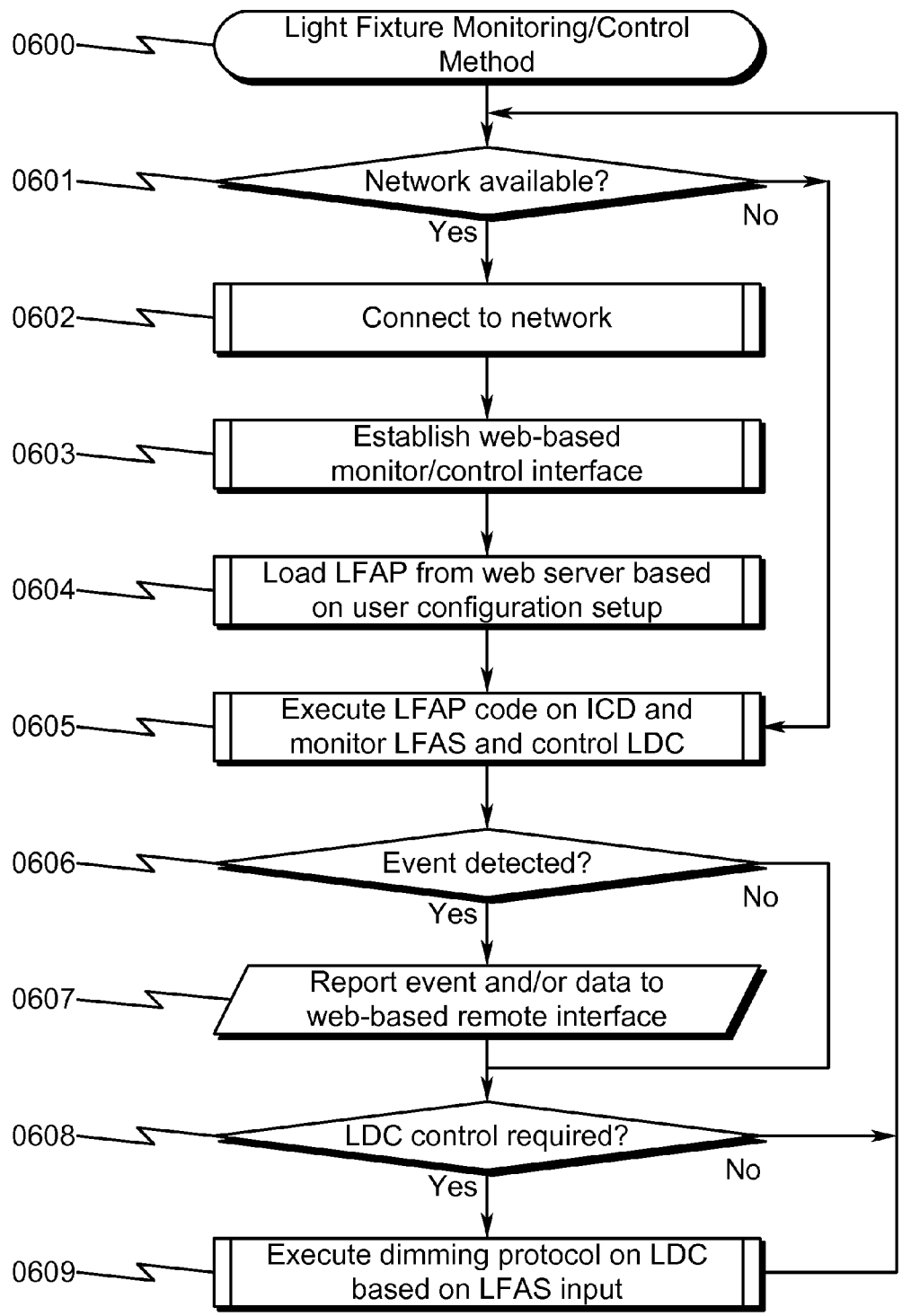
FIG. 6 illustrates a method flowchart describing a presently preferred embodiment of the present invention.

While this invention is susceptible of embodiment in many different forms, there is shown in the drawings and will herein be described in various detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a LIGHT FIXTURE MONITORING/CONTROL SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Invention Nomenclature

The following nomenclature will be used in describing the present invention:

Dimmer—A device used to vary the brightness of a light from 0 (turned off) to 100%. By decreasing or increasing the mean power to the lamp, it is possible to vary the intensity of the light output. It is intended to control light output from resistive incandescent, compact fluorescent lights (CFLs) and light-emitting diodes (LEDs). The term dimmer in this document may also apply to situations in which a switch is used to turn on/off the light.

TRIAC—Triode for Alternating Current, an electronic component that can conduct current in either direction when it is triggered. TRIAC is bidirectional and so current can flow through it in either direction. Once triggered, the device continues to conduct until the current drops below a certain threshold.

DIAC—Diode for Alternating Current, a diode that conducts current only after its breakover voltage has been reached momentarily.

WiFi—A popular technology that allows an electronic device to exchange data wirelessly (using radio waves) over a computer network, including high-speed Internet connections.

ZIGBEE®—A specification for a suite of high level communication protocols using small, low-power digital radios based on an IEEE 802 standard for personal area networks.

CFL—compact fluorescent light.

Sub-network (subnet)—is a local area network connected to another network via a router or a gateway. A subnet is dedicated to home automation purpose in the context of this document.

Dim—to increase or decrease the brightness of a light. "Dim" normally implies a decrease in the brightness. Within this context this term will be used for both directions and include the full "on" and completely "off" levels of brightness.

System Overview

Figure 7:
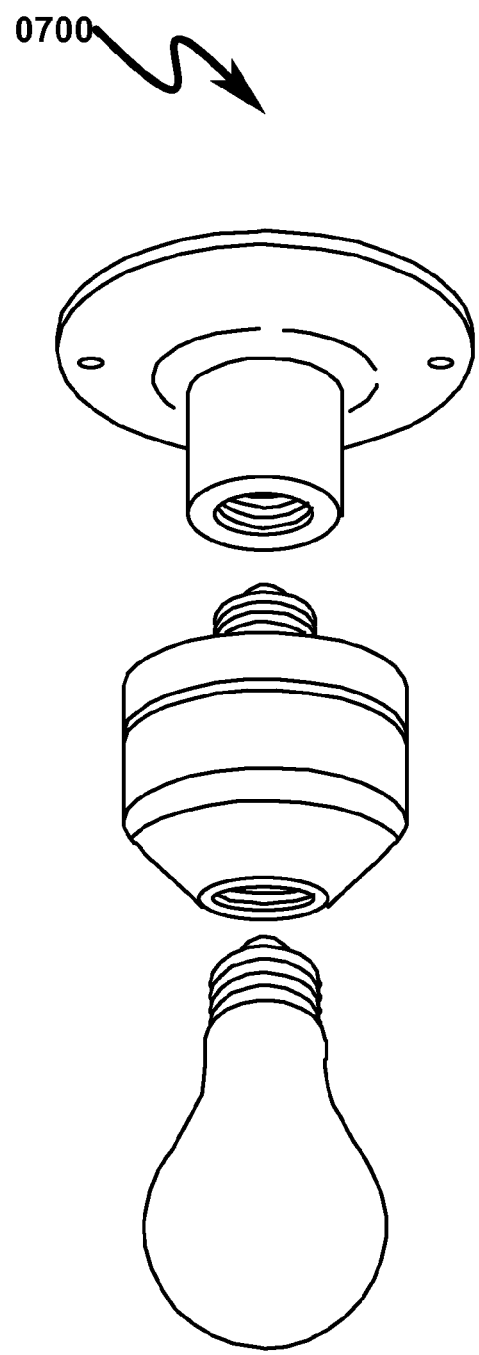
FIG. 7 illustrates an exemplary application context for the present invention.

The present invention teaches a system that comprises the light bulb socket adaptor (as generally depicted in the adapter (0710) within FIG. 7 (0700) between the light fixture (0701) and light bulb (0702)) and a remote control that doubles as a subnet router and an Internet gateway. The socket adapter may be referred to as a dimmer within the context of the present invention. The dimmer can control the brightness of the light/lamp from 0% (turned off) to 100% of the maximum watt rating and may include solid state and/or mechanical switching means to accomplish this function. The present invention includes the following features:

Mini-Slot. Rather than putting a fixed control and communication module in the socket adaptor, the present invention provides for a mini-slot, where a user may plug in a control module that communicates with the remote control.

Remote Control. A remote control that is also a subnet (the wireless network that the dimmer is communicating with) router and an Internet gateway.

The advantage of the removable part of the Mini-Slot is that while the switch and dimmer circuitry is fixed in the socket adaptor, it is possible to have the flexibility of changing the control logic and communication scheme by putting in a small form-factor card into the "standard" slot of the dimmer. For example, some system configurations may provide different modules for different customers. Some customers may need a motion sensor in the dimmer to detect movement while others may require an ambient light sensor for controlling the dimmer and yet still others may desire a sound sensor to turn on the light when ambient noise is too loud.

The remote control can directly communicate with the wireless module in the dimmer and also serves as a subnet router and an Internet gateway. This not only allows people to control and see the status of the dimmer from anywhere, it also allows the dimmer to work with other devices. For example, when a car is driving into the driveway, a sensor near the driveway detects that and sends a signal for the dimmer to flash through the remote control.

Within the following description of the invention, the working principle of a dimmer, the structure of the dimmer, and the remote control of the dimmer, and the invention summary will be sequentially detailed.

Dimmer Description

The TRIAC-DIAC based light dimmer is the most common dimmer and has been widely used in a variety of household applications. In the dimmer control circuit in FIG. 8 (0800) the DIAC is used to trigger a TRIAC by the "Phase Control" method. The AC mains waveform is phase shifted by the RC (Resistor and Capacitor) circuit so that a reduced amplitude, phase delayed version of the mains waveform appears across capacitor, C1. In this case, $R_v$ is a variable resistor in mechanic form or, an analog trimming pot. As this wave reaches the break-over voltage of the DIAC, it conducts and discharges capacitor C1 into the gate of the TRIAC, thereby triggering the TRIAC into conduction. The TRIAC then conducts for the remainder of the mains half cycle, and when the mains voltage passes through zero it turns off. In to the next (negative) half cycle, the voltage on C1 reaches break-over voltage in the other polarity and the DIAC again conducts, providing an appropriate trigger pulse to turn on the TRIAC.

By making Variable Resistor $R_v$, the amount of phase delay of the waveform across capacitor C1 can be varied, allowing the time during each half cycle at which the TRIAC fires to be controlled. In this way, the amount of power delivered to the load such as lights or fans can be varied. It is how the TRIAC/DIAC-based light dimmer works.

Wireless control enables reducing overall system cost by eliminating the cost of cabling. There is also a significant return on investment from energy savings obtained by intelligent control, especially when the wireless network includes sensors. Light Dimming will be an important feature in the future of smart lighting. The marriage of wireless IP connectivity with energy-efficient lighting technology in secure, compact, low-cost solutions can be implemented with modules small enough to integrate into the light fixture. Since the variable resistor used in the existing dimmers is the mechanical resistive trim pot it isn't suitable for wireless remote control application such as WiFi and ZIGBEE®, etc. The replacement of digital potentiometer from the mechanic trimming pot is one of our major approaches to wireless control.

Some articles suggest integrating the wireless control circuit module into each individual light bulb. But it will cost the customers much more than those embedded into the light fixture. Plus the light bulb is typically running hot and its temperature can be up to 125° C. It means all components inside the wireless control circuit need to meet the higher specification requirement such as Military standards. It is not practical to design and manufacture for the low-cost household appliances with Military specification. The way to embed the dimmer into the light fixture has a huge advantage on thermal release and allows the control unit to stay live much longer. There are several reasons to introduce a plug & play dimmer controller embedded in the light fixture for incandescent bulbs, CFL-based, and LED-based lamps. This technology permits control of incandescent bulbs, CFL-based, and LED-based lamps and may also apply to speed controls for any ceiling fans and motors, etc.

Description of a Plug & Play Dimmer

Figure 9:
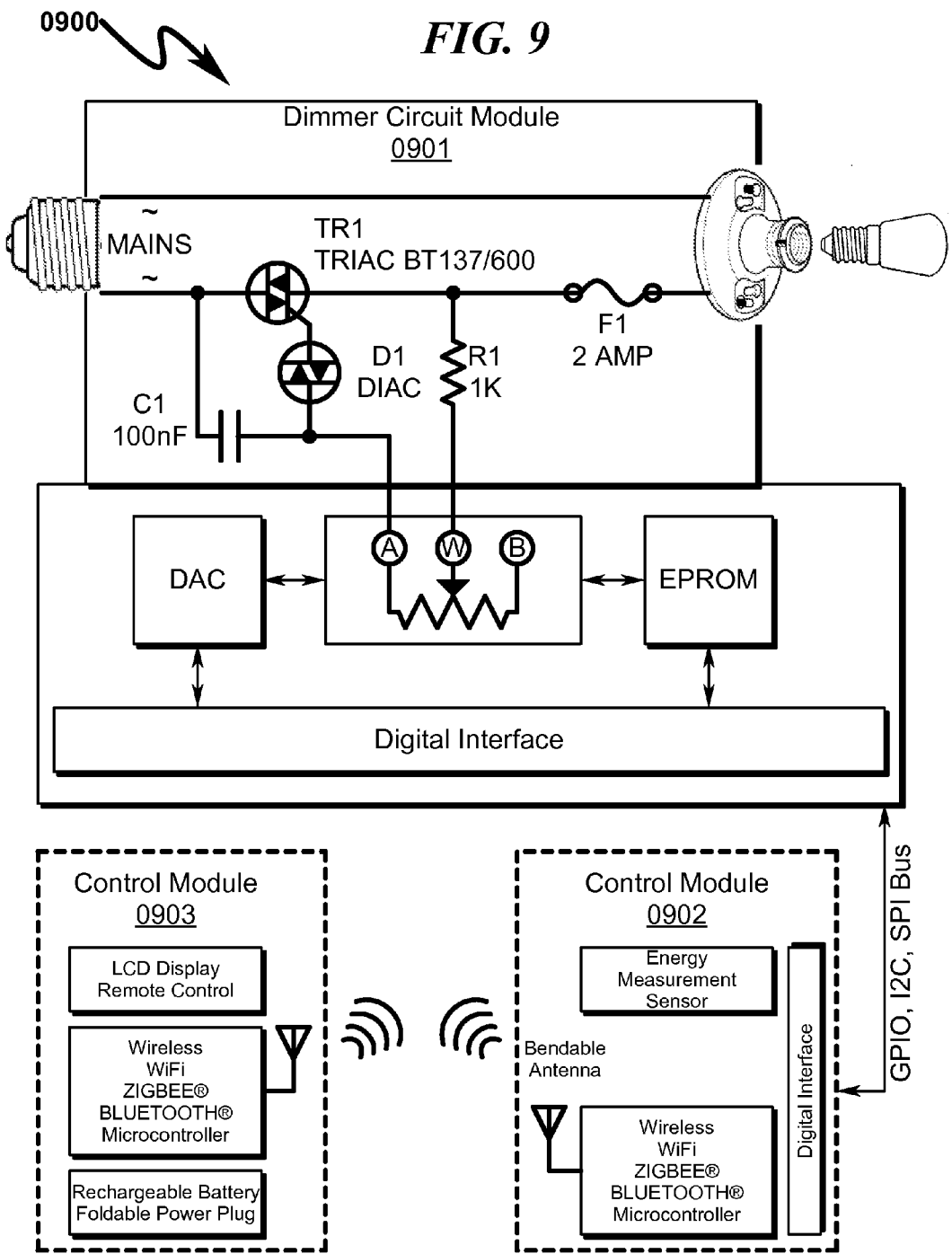
FIG. 9 illustrates Dimmer Socket Adaptor (the figure also shows the remote control on the lower left corner)

A dimmer shown in FIG. 9 (0900) consists of the following parts:
TRIAC/DIAC circuit;
Digital potentiometer that replaced from the mechanical trim pot;
Wireless transceiver and MCU (WiFi or ZIGBEE®)
Sensors;
Energy monitoring unit; and
Flexible antenna unit.

TRIAC/DIAC control circuit is implemented with a digital potentiometer to achieve variable amounts of power delivered to the light bulb or ceiling fan. In this case, the variable resistor Rd in digital potentiometer performs the function of the mechanical resistor Rv in FIG. 8 (0800) by replacing the mechanics with a simple 2-wire digital interface such as I²C bus or SPI, etc.

Figure 8:
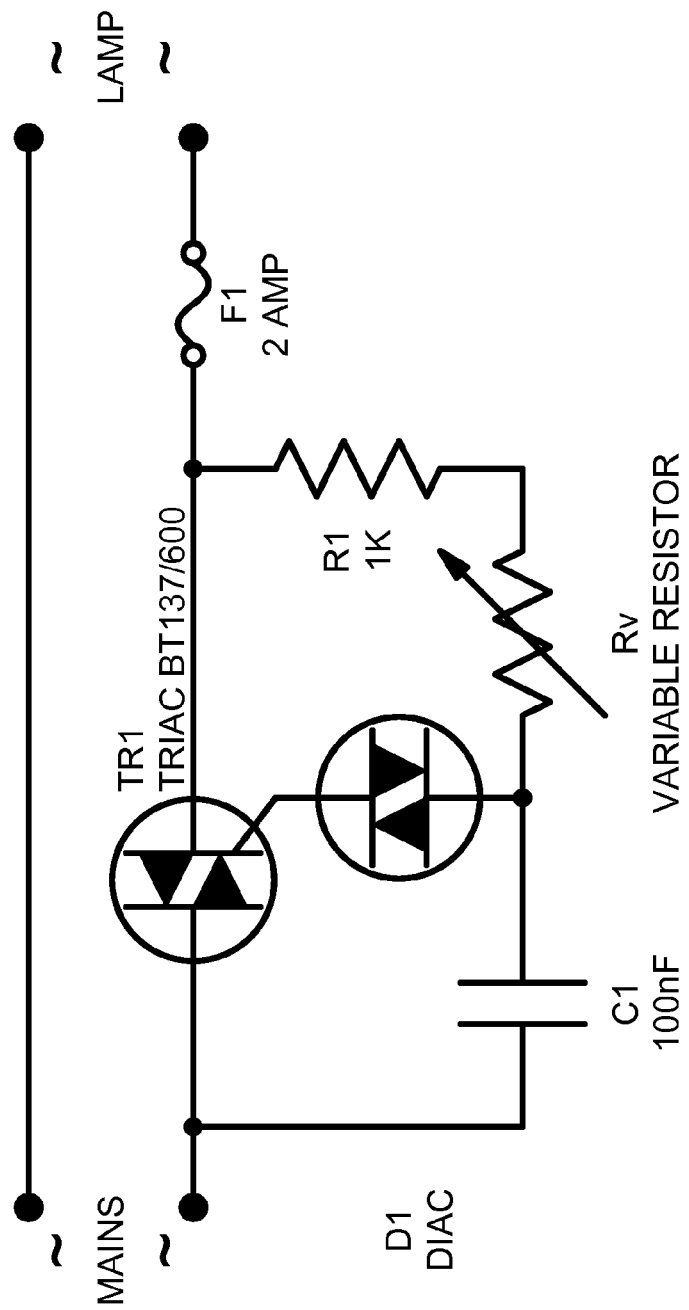
FIG. 8 illustrates the existing TRIAC Dimmer Light Controller.

In the TRIAC-DIAC circuit in FIG. 9 (0900) it is similar to that in FIG. 8 (0800) except with a digital potentiometer. The AC mains waveform is phase shifted by the circuit with capacitor C1 and variable Rd so that a reduced amplitude, phase delayed version of the mains waveform appears across capacitor, C1. As this wave reaches the break-over voltage of the DIAC, it conducts and discharges capacitor C1 into the gate of the TRIAC, so triggering the TRIAC into conduction. The TRIAC then conducts for the remainder of the mains half cycle, and when the mains voltage passes through zero it turns off. While into the next half cycle, the voltage on C1 reaches break-over voltage in the other polarity and the DIAC again conducts, providing an appropriate trigger pulse to turn on the TRIAC. By varying Rd, the amount of phase delay of the waveform across capacitor C1 can be varied, allowing the time during each half cycle at which the TRIAC fires to be controlled. In this way, the amount of power delivered to the load such as lights or fans can be varied, and the function of dimming is implemented.

A wireless RF transceiver/MCU receives the dimming commands (to increase or decrease the light brightness) via its wireless module from the remote control discussed below.

The dimming operations are also based on some types of "local" sensors connected to the MCU (not shown in FIG. 9

(0900)). For example, the ambient motion sensor may increase or decrease the brightness of the light based on people walking towards or away from the light. The light sensor may increase or decrease the brightness of light based on the ambient light.

How sensors trigger the dimming operations are set by the remote control and recorded in the dimmer MCU. For example, when a light sensor detects the ambient light exceeding certain brightness, it would decrease the light brightness to a certain percentage. When a motion sensor detects people in the room, it would increase the light brightness to a certain percentage. This type of configuration is infinite. The remote control provides a user interface for users to set it up.

The dimming commands are converted by MCU into $I^2C$ or SPI protocol and then sent to the series interface of digital potentiometer via $I^2C$ or SPI bus. The digital potentiometer converts the commands from the digital bit stream into the analog signal. The value of variable resistor Rd will be adjusted proportionally to the amplitude of the analog signal.

The MCU reports the dimmer status—the light brightness in terms of percentage and the events when a local sensor triggers a dimming action—to the remote control, either event-driven or at the request of the remote control.

The dimmer essentially has two components:
the current regulating component comprising of TRIAC/DIAC circuit and digital potentiometer; and
the control component comprising of the energy measurement unit, wireless module (WiFi or ZIGBEE®) & MCU, sensors and flexible antenna unit.

Figure 10:
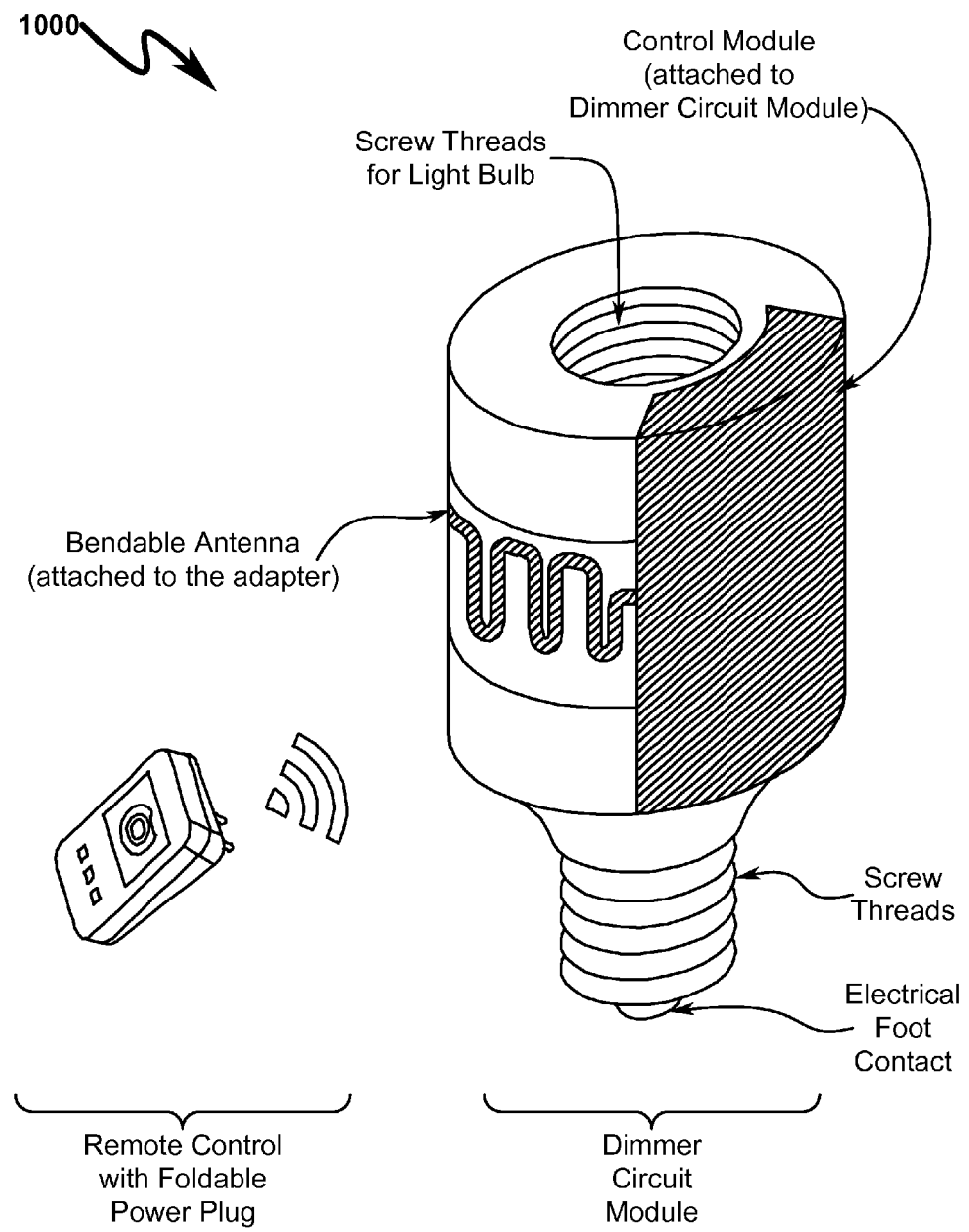
FIG. 10 illustrates Dimmer Socket Adaptor with Control Module attached.
Figure 11:
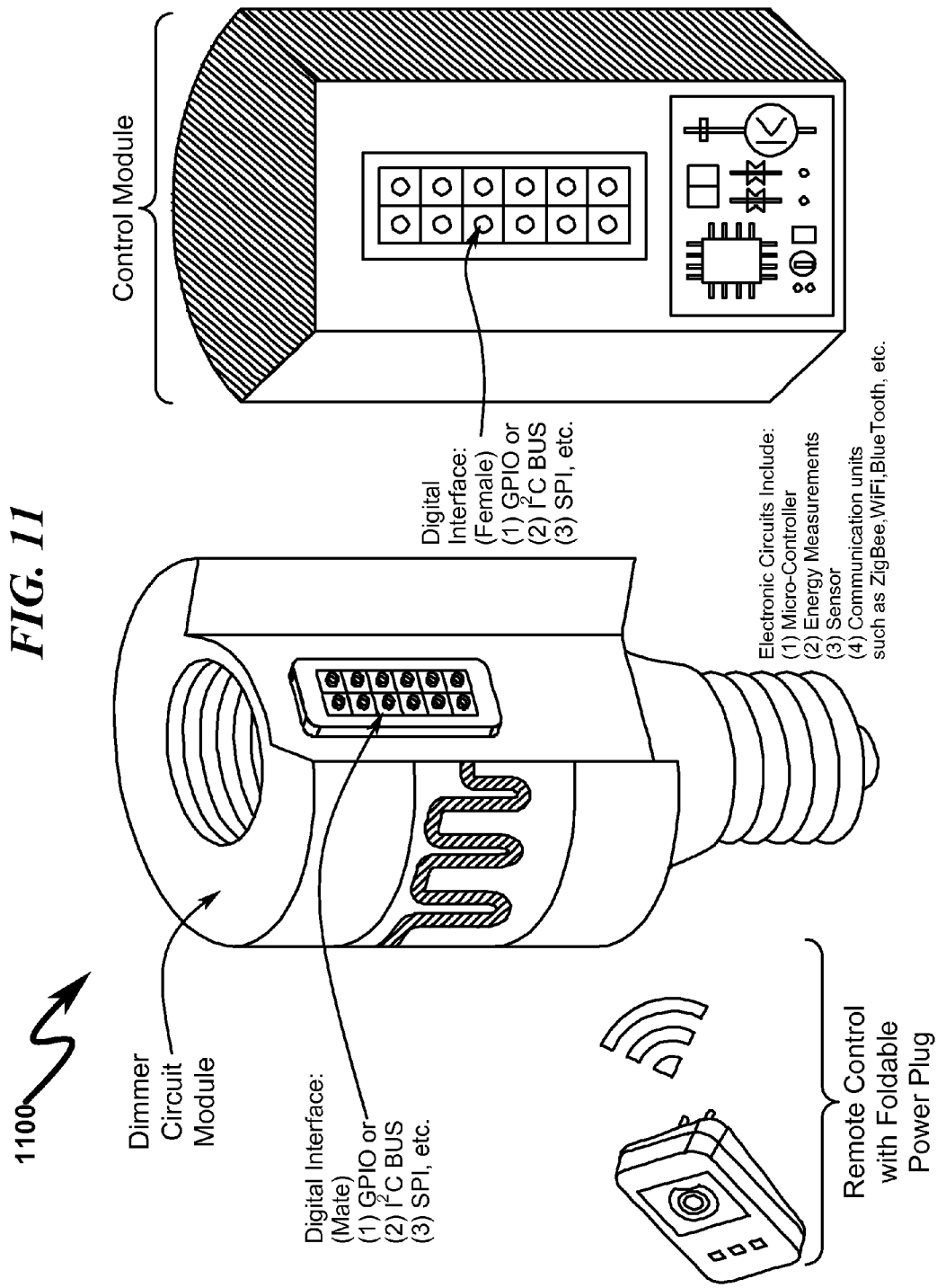
FIG. 11 illustrates Control Module separated from Dimmer Circuit Module.

The following highlight the innovative aspects of the dimmer:
The present invention may incorporate an energy monitoring unit that reads the power measurement and interacts with a user through the wireless module.
To enable operation within the small housing space of the dimmer, the present invention makes use of an antenna that can be bent and installed around the wall of the circular housing. This flexible antenna is printed on a bendable board to enhance the wireless RF signal strength. It is connected to Wireless, WiFi, or ZIGBEE® Transceiver module via a standard cable assembly. FIG. 10 (1000) and FIG. 11 (1100) show the bendable antenna attached to the inside of the fixture wall. The antenna is connected with the control component via standard RF connector.
The control component is a removable piece from the dimmer, as shown in FIG. 11 (1100). The control module has a standard interface (pin connector) with the current regulating component. The standard interface allows different control modules to work in the dimmer.

Remote Control

Figure 12:
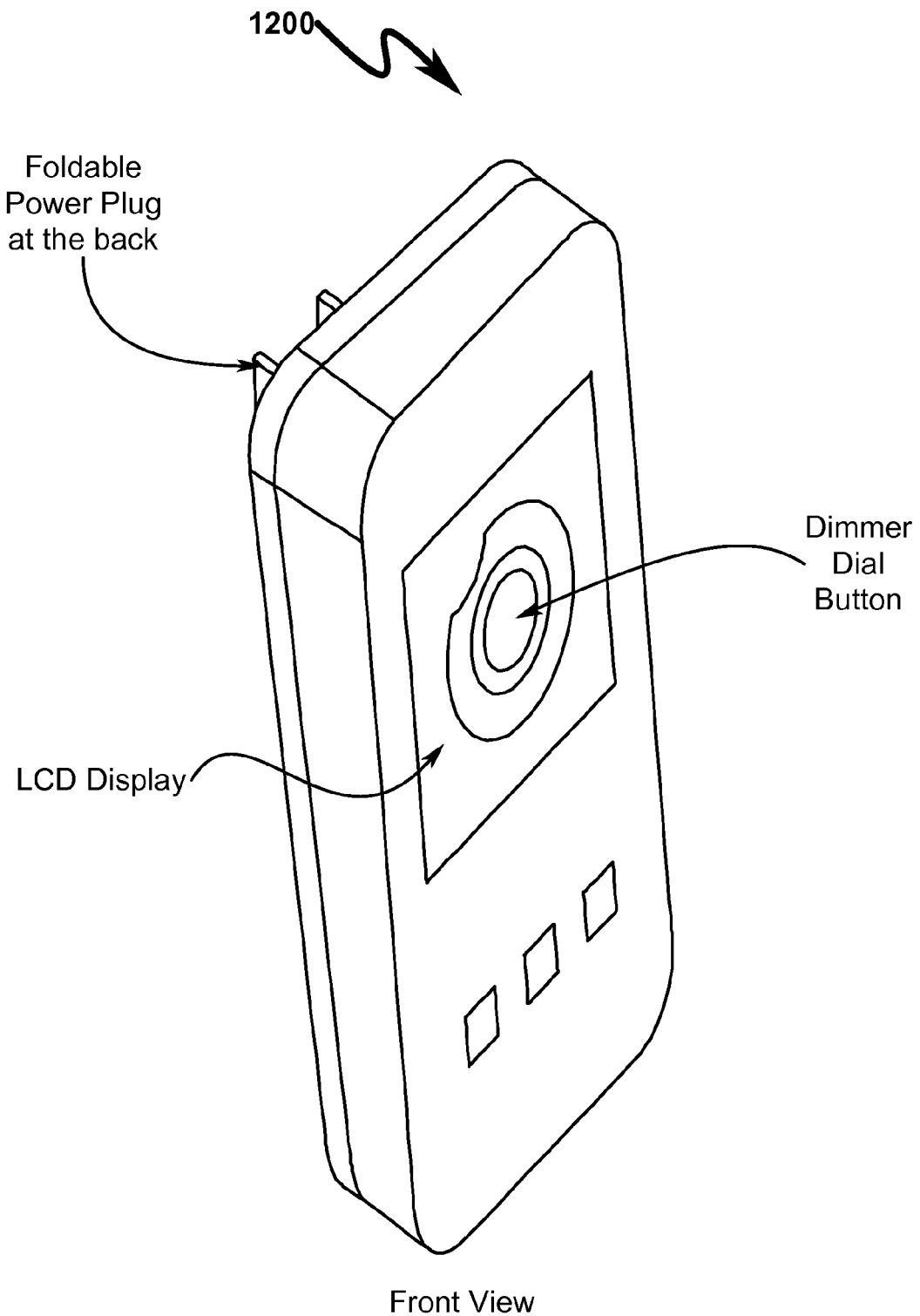
FIG. 12 illustrates Remote Control (Front View)
Figure 13:
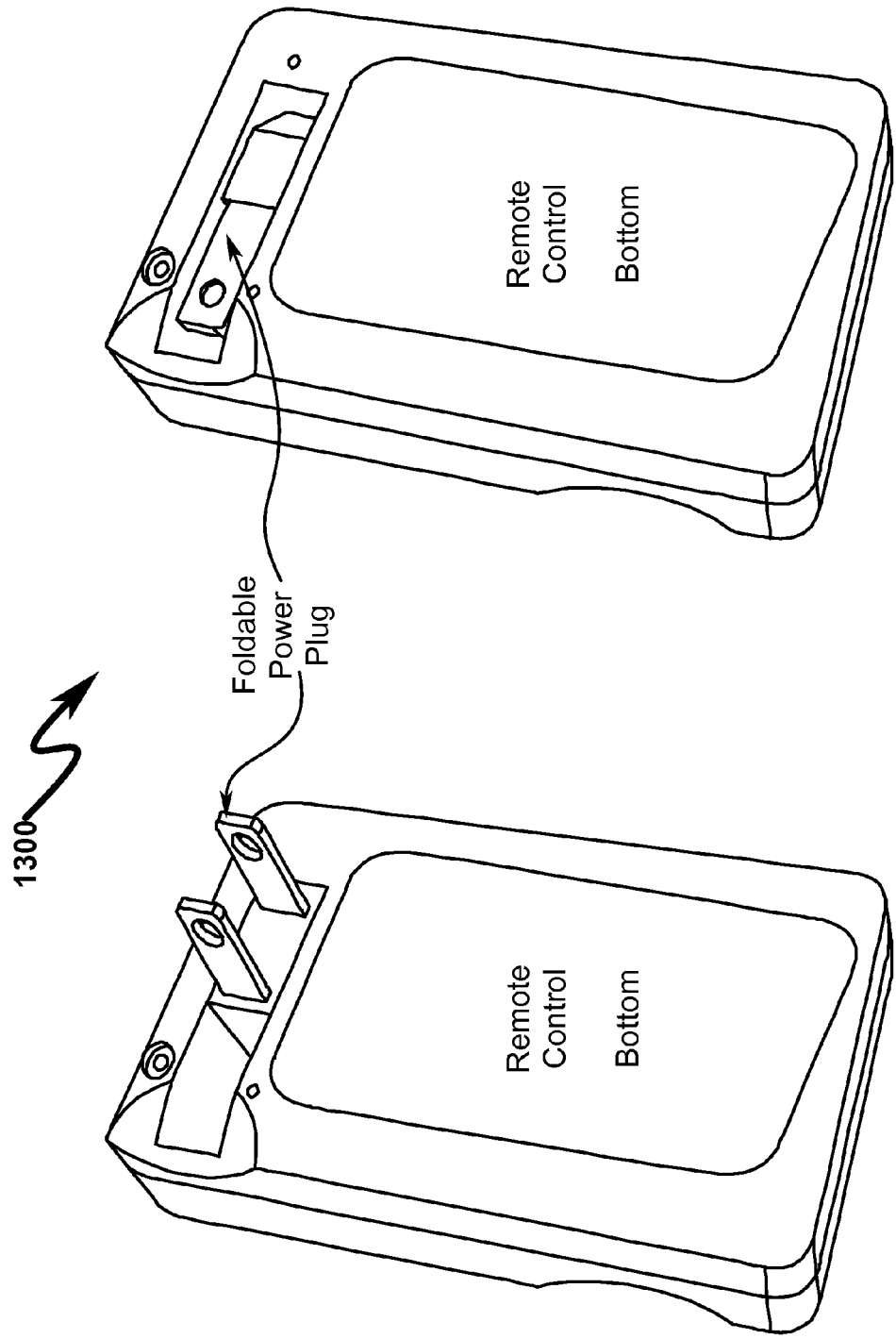
FIG. 13 illustrates Remote Control (Bottom View) with a Foldable Power Plug.

FIG. 12 (1200) and FIG. 13 (1300) show the remote control. The users can hold the device like a regular remote control (it contains a rechargeable battery) or plug it into a power socket with a "foldable" power plug at the back. It contains a rechargeable battery. The remote control has a unique casing design that combines a "look-and-feel" of a remote control and also a pluggable Internet gateway.

Figure 14:
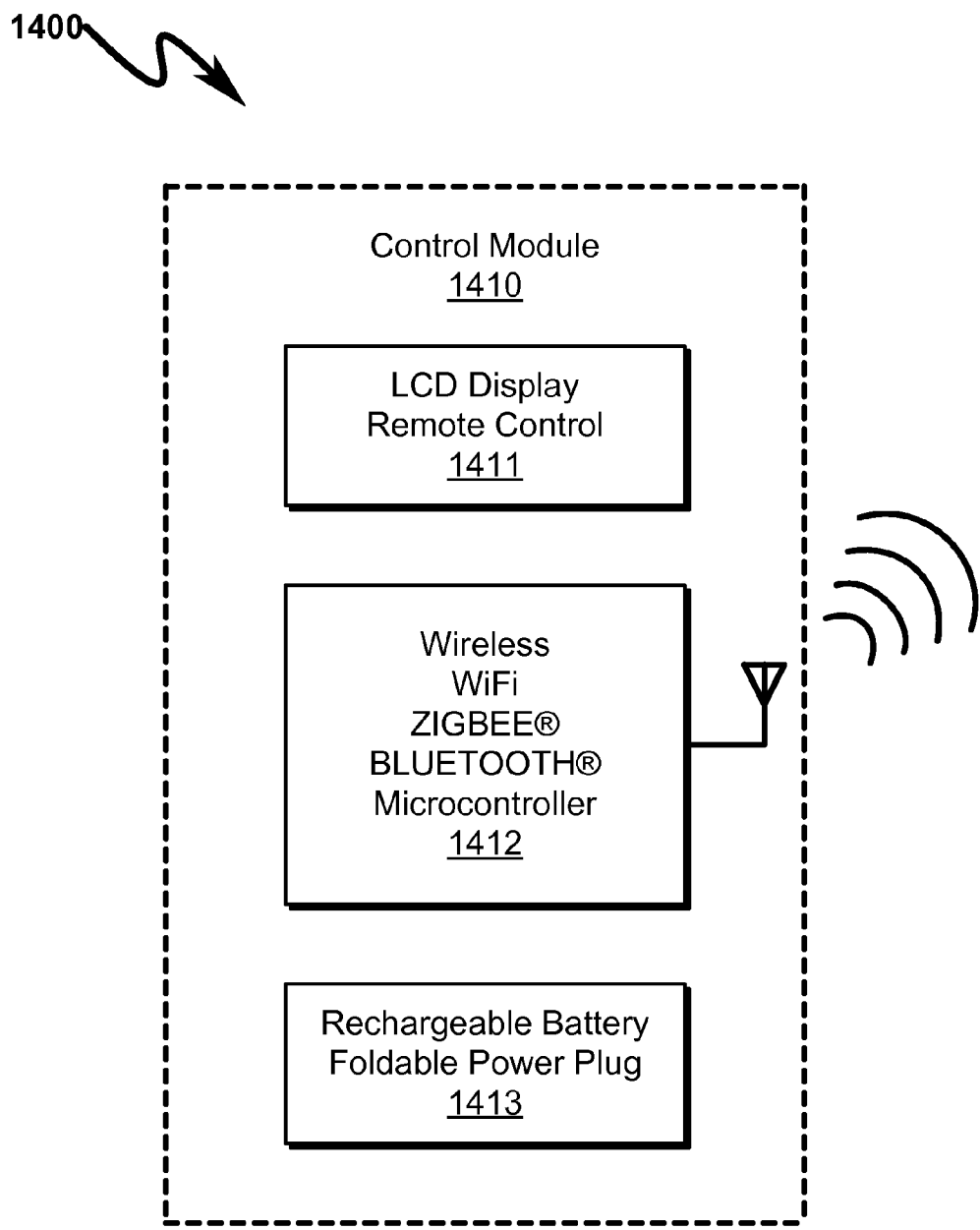
FIG. 14 illustrates Electronic Components inside the Remote Control.

FIG. 14 (1400) shows the diagram of the remote control. This remote control is an embodiment of the system described in the patent applications included by reference above—using the same schematic and block diagram—with the added functionality of a remote control interface.

On one hand, it contains a WiFi module that allows the remote control to communicate with users through the Internet. On the other hand, it contains a wireless module (removable or fixed) that communicates with the dimmer or any devices that are on the same subnet. The communication protocol between the remote control and the dimmer can be any popular communication protocol, for example, BLUETOOTH®, ZIGBEE®, and WiFi. As an example, if the communication on the subnet is ZIGBEE®, then the remote control may serve as a router to relay information from a ZIGBEE® sensor to the dimmer. In this case, we may have a separate motion ambient sensor (not embedded in the dimmer) that sends a message of someone approaching the sensor to the remote control, which will send a command correspondingly to the dimmer.

The control commands are sent over the communication to the dimmer, whether they originate from the remote control in the case, users directly touch and press the remote control, or originate from Internet commands that are then relayed by the remote control.

The status of the dimmer (the energy consumption, the light brightness and event) is sent back in the reverse path. The events include the energy consumption and local "triggers" from sensors that start and stop the dimming operations.

Figure 15:
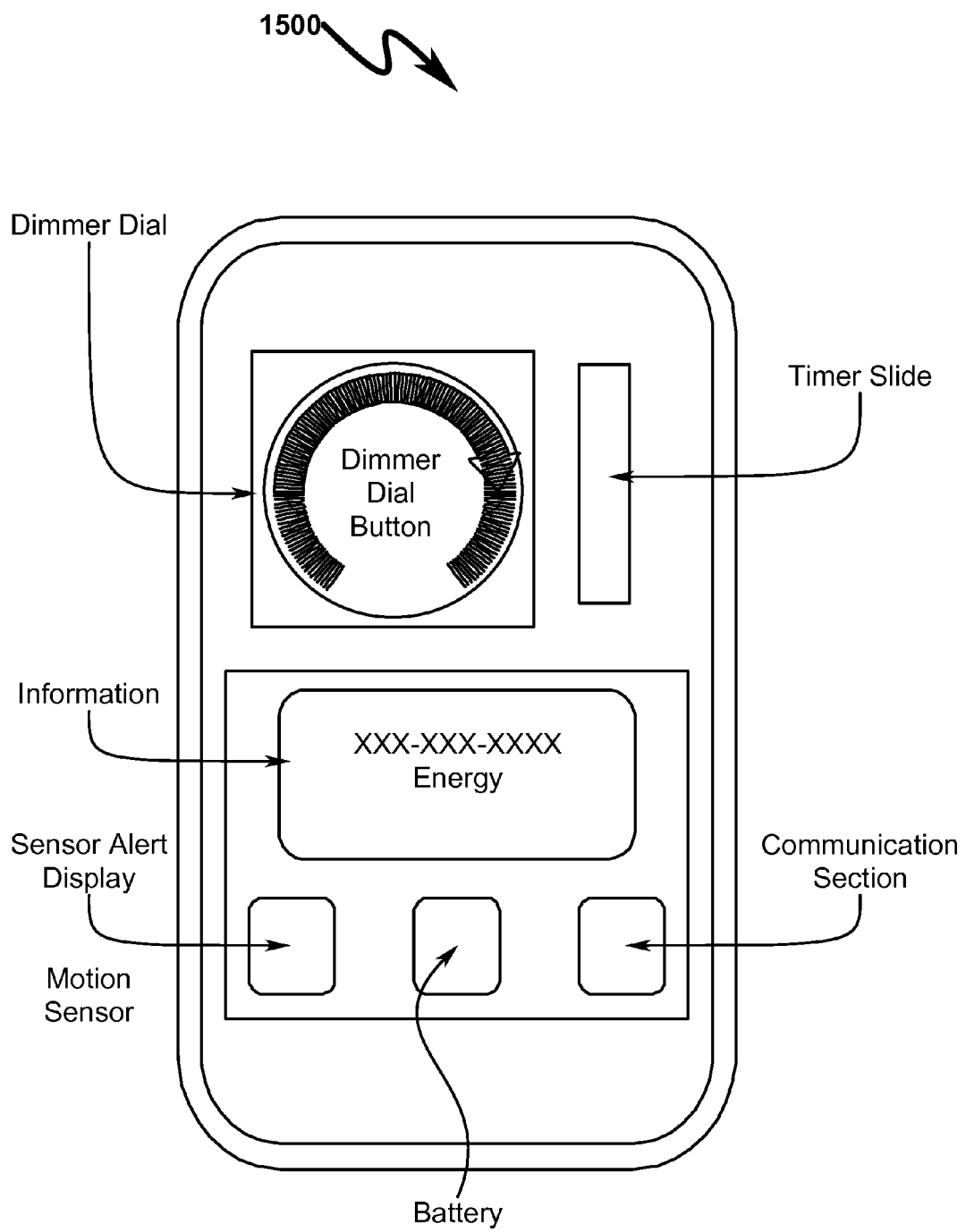
FIG. 15 illustrates Remote Control User Interface Display.

While this device has all the communication capability with the Internet as well as with devices on the local subnet, it is also a remote control in the conventional sense, which allows users to directly control the dimmer using the remote control. FIG. 15 (1500) shows a design of the user interface on the remote control.

Figure 16:
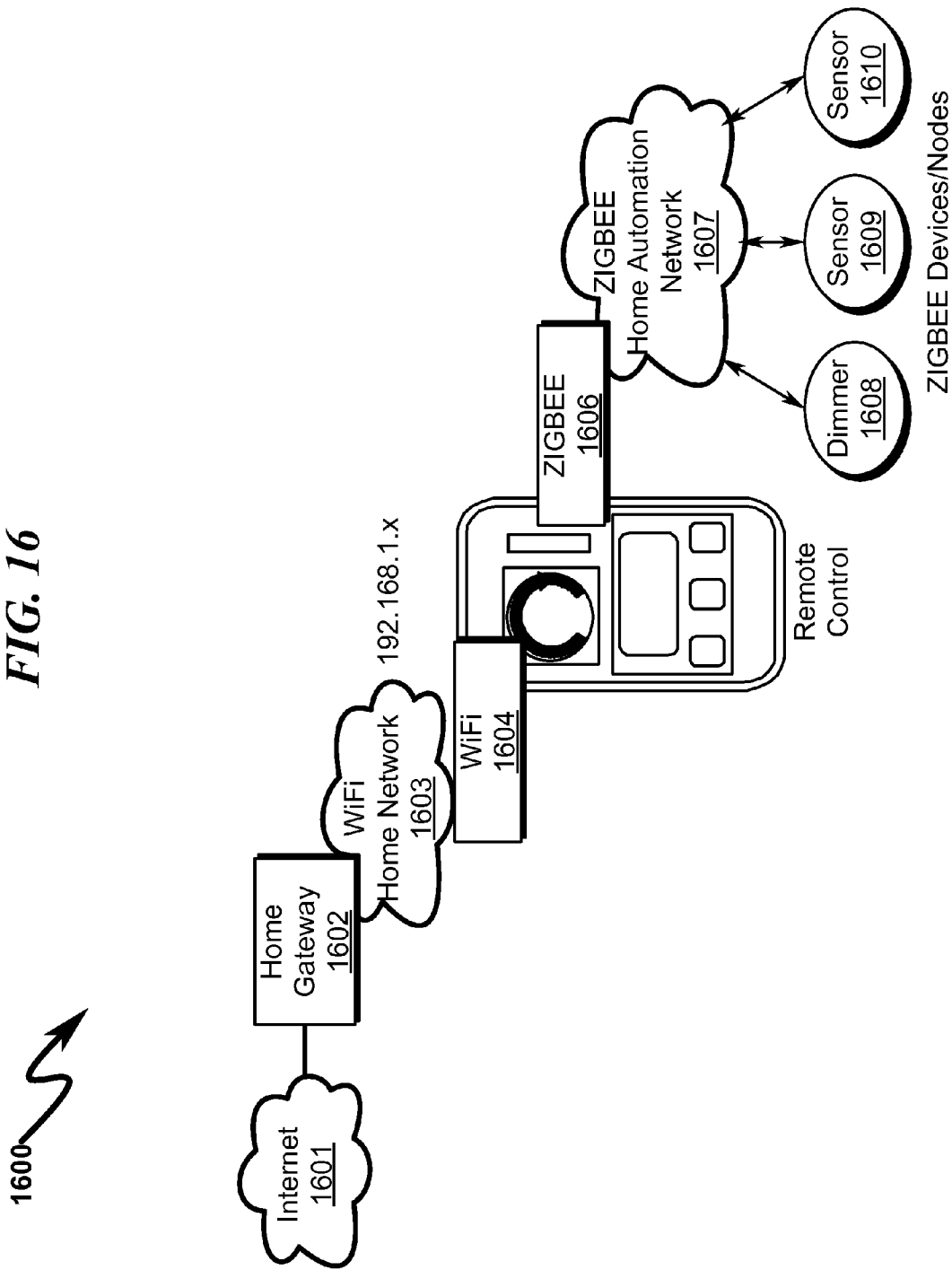
FIG. 16 illustrates Remote Control double as a router and Internet Gateway.

The remote control is therefore a mixture of a remote control, a router of the local sub network where the dimmer resides, and a network router and an Internet gateway. FIG. 16 (1600) shows the multiple roles the remote control play, where the subnet is a ZIGBEE® network.

To summarize, the remote control provides the following functionality:
[1] The local user interface. It displays dimmer status on a LCD display and it receives the user input either though the touch screen of the LCD or the buttons on the remote control. User input includes (1) scheduling when and how much to dim the light—periodically or one-time; (2) setting up the rules (or trigger conditions) for the sensors in the dimmer—how much to dim in what sensor conditions; (3) setting up the rules for other sensors in the same subnet.
[2] The user interface over the Internet. Since the remote control is connected to the internet via its WiFi connection to the home network, users can access the remote control from anywhere via the Internet. Document PCSM and Document DSSM discuss in detail how this remote access is accomplished. With the remote access, users can remotely provide the input and see the dimmer status as in [1] above.
[3] The coordination of other sensors on the same subnet or Internet when the latter sends the sensor information to it. It will discover the sensors on the same subnet or Internet, request and receive the data from the sensors. It will analyze the data and decide if the sensor data should effect the light brightness of the dimmer based on rules set in [1]. Document DSSM discusses how a coordination device for home automation discovers sensors and requests/processes sensor information.
Record the user setup in [1] and [2] in its memory, and send control commands to the dimmer accordingly. In particular, if the dimming operation is periodic, the remote control must remember the schedule and "wake up" and send a control command. Also, it must send the rules for dimmer-embedded sensors to the dimmer.

[5] Requests and receives status reports from the dimmer and updates the local user interface and the network user interface with the reported results.

The functionality of the remote control is discussed in the following sections.

User Interface

The UI is responsible for the following functions:

Setting the dimmer operations: the percentage of light brightness (0%-100%), the time of operation (now, one-time in the future, or periodically). In the case of periodical dimmer operation, set the first time, the period, and the total number of operations.

Setting the rules for the sensors to trigger the dimmer operations. If the sensors are embedded in the dimmer, a configuration message is sent to the dimmer. If the sensor is not embedded in the dimmer but on the same subnet or Internet, then the remote control must record the setting; when the sensors deliver data to it, it must analyze the data and make a decision based on the rule as to whether a dimmer operation is necessary if so, it sends a control command to the dimmer accordingly. Document DSSM discusses a system for a coordinating device to configure sensors and communicate with them.

Display the dimmer status on the UI: energy consumption of the dimmer, the current brightness of the dimmer, and the sensor events triggering a dimmer operation.

Users have multiple ways to configure and see the status of the dimmer. It can use the interface on the remote control directly or assess the Internet via a web server or using an application on the users' devices, e.g., smartphone and tablet. The patent applications herein incorporated by reference discuss in detail the user interfaces designed to configure and get results from the controllers and sensors for home automation, including setting the rules for sensors to trigger control actions. The look and feel of the user interfaces will differ between that on the remote control and that over the Internet. But the content of the UI as discussed above is the same.

For Internet based UI, some additional features are provided by remote control, as discussed below.

Using Web Server Over Internet

The WiFi module in the remote control provides an Internet connection through the home gateway between a user device located anywhere and the remote control. Document PCSM discusses how this connection is configured. Once the Internet connection is setup, there are two ways users can configure and monitor the dimmer via the Internet connection.

Mode 1: Web Server on the Remote Control

A web server is hosted on the remote control. Users can remotely access a web page using the WiFi network at home and configure the dimmer on the web page, which is delivered to the dimmer by the remote control. A dimmer status report will also be displayed on the web page.

Mode 2: Web Server Hosted on a Proxy Internet Server

Rather than putting a web server in the remote control, a proxy web server is hosted on an Internet server in the Internet cloud. The proxy web server communicates with the remote control, sending user inputs to remote control and receiving dimmer results from the remote control. Users can download an application to their smartphones or tablets or computers. The application interacts with the proxy server, allows users to set dimmer configurations and read the dimmer status.

Event Notification

One important feature enabled by the Internet connection is that users can configure the remote control such that users can get notifications in their emails or apps when some events have occurred. Users use the web page on the remote control or the Apps on their smartphones to configure which events they will be notified of and in what way.

There are a set of predefined events. Examples of these events include:
Every time a dimmer operation is started;
When the light is on over a pre-specified time;
When the energy consumption exceeds a pre-set limit (the dimmer can measure the energy consumption and report the results to the remote control).

The event notification includes the time the event happened, the type of the event (a sensor triggered dimmer operation or user configured dimmer operation).

Users can configure how they are notified, by emails or apps. The events can be sent with some additional information such as a video clip as discussed below.

The software running on the remote control can record the history of the events. Users can see the history of the events from the UI as well.

Camera Synchronized with the Event

A video camera is integrated with the remote control in the sense that the video recording is synchronized with the events of the dimmer, rather than an independent video camera. The video camera is presumably monitoring the same area where the light is located.

Users can configure the video recording for a certain duration based on the events of the dimmer and have the video sent to them as part of the event notification (for example) when a sensor triggers a dimmer operation.

We assume that the video camera is a web camera, meaning it can communicate with the WiFi module of the remote control. The camera sets up an Internet connection with the WiFi module of the remote control. When an event happens, the remote control software sends an Internet message to the web camera, to start the recording and stops it when recording duration is over. When the video recording is over, the video clip is sent to the WiFi module. The remote control software attaches the video clip to the notification of the corresponding event.

All the communications involved with this video synchronization are based on Internet protocol (IP). A skilled network engineer can implement such an application.

SUMMARY

The present invention teaches a system for dimming (controlling the brightness) a light bulb of any type. It contains a small-form factor light bulb socket (called dimmer) and a remote control.

Dimmer

The dimmer is housed in a light bulb socket adaptor and can be controlled from the remote control and from anywhere via Internet. The dimmer has a removable part that contains an energy measurement unit, a MCU, sensors, and a wireless communication module.

The antenna of the wireless module is printed on a bendable (curved or flexible) PCB and installed on the inside of the circular wall of the dimmer fixture.

Remote Control

The remote control doubles as a subnet controller and an Internet gateway. It allows users to hold it as a regular remote controller and also can be plugged into a power outlet like a regular router.

Users can setup the dimmer and see the dimmer reports (dimming parameters, events and energy consumption) directly on the remote control or remotely via the Internet. The remote control allows the dimmer to respond to other sensors on the same subnet as the dimmer via the remote control. The remote control can send event notifications to users via email, text messaging and applications.

Video Camera

A video camera is synchronized with the remote control such that when a dimmer event (defined as a dimmer operation triggered either by a sensor or a user input) occurs, a video clip is recorded and sent with an event notification.

Security Monitoring

By networking individual light fixtures together, the present invention anticipates that a network "grid" of intercommunicating security monitors (configured with audio/video/motion sensors can be implemented in a retrofit fashion within any facility augmenting their standard light bulbs with the LFAs described herein. This permits the easy retrofitting of security functions in installations where a wired infrastructure would be costly or impractical.

Preferred Embodiment System Summary

The present invention preferred exemplary system embodiment anticipates a wide variety of variations in the basic theme of construction, but can be generalized as a light fixture monitoring/control system comprising:
(a) source electrical input connector (SEIC); and
(b) sink electrical output connector (SEOC);
(c) lamp dimmer control (LDC);
(d) integrated computing device (ICD);
(e) light fixture adapter sensor (LFAS); and
(f) wireless communication interface (WCI);
wherein
the LDC is configured to control the flow of electrical current from the SEIC to the SEOC under direction of the ICD;
the ICD is configured to monitor the LFAS;
the ICD is configured to control the LDC in response to inputs from the LFAS;
the ICD is configured to monitor the WCI;
the ICD is configured to control the LDC in response to inputs from the WCI;
the ICD is configured with a web-browser interface permitting remote monitoring of the LFAS via the WCI;
the ICD is configured with a web-browser interface permitting remote control of the LDC via the WCI;
the ICD is configured to execute instructions stored in a lamp fixture adapter program (LFAP);
the LFAP is configured to allow local control and monitoring of the LDC in response to inputs from the LFAS;
the LFAP is configured to allow local control and monitoring of the LFAS in response to inputs from the WCI;
the LFAP is configured to allow the LFAS to be monitored and controlled by the web-browser interface;
the LFAP is configured to allow reporting of LFAS detected events to the WCI; and
the LFAP is configured to be remotely programmable via the WCI via the web-browser interface.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a light fixture monitoring/control method, the method operating in conjunction with a light fixture monitoring/control system comprising:
(a) source electrical input connector (SEIC); and
(b) sink electrical output connector (SEOC);
(c) lamp dimmer control (LDC);
(d) integrated computing device (ICD);
(e) light fixture adapter sensor (LFAS); and
(f) wireless communication interface (WCI);
wherein
the LDC is configured to control the flow of electrical current from the SEIC to the SEOC under direction of the ICD;
the ICD is configured to monitor the LFAS;
the ICD is configured to control the LDC in response to inputs from the LFAS;
the ICD is configured to monitor the WCI;
the ICD is configured to control the LDC in response to inputs from the WCI;
the ICD is configured with a web-browser interface permitting remote monitoring of the LFAS via the WCI;
the ICD is configured with a web-browser interface permitting remote control of the LDC via the WCI;
the ICD is configured to execute instructions stored in a lamp fixture adapter program (LFAP);
the LFAP is configured to allow local control and monitoring of the LDC in response to inputs from the LFAS;
the LFAP is configured to allow local control and monitoring of the LFAS in response to inputs from the WCI;
the LFAP is configured to allow the LFAS to be monitored and controlled by the web-browser interface;
the LFAP is configured to allow reporting of LFAS detected events to the WCI; and
the LFAP is configured to be remotely programmable via the WCI via the web-browser interface;
wherein the method comprises the steps of:
(1) determining if the computer network is accessible via the WCI, and if not, proceeding to step (5);
(2) connecting to the computer network via the WCI;
(3) establishing a web-based monitoring and control interface on the ICD;
(4) loading the LFAP from the web-server based on a user configuration setup;
(5) executing LFAP instructions on the ICD to monitor the LFAS and control the LDC;
(6) determining if a LFAS event has occurred and if not, proceeding to step (8);
(7) reporting the event and/or sending data to a web-based remote interface;
(8) determining if LDC control is required by a local or remote control instruction, and if not, proceeding to step (1);
(9) executing a dimming instruction protocol on the LDC based on LFAS input and proceeding to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein said SEIC comprises an E26 light bulb socket.
An embodiment wherein said SEOC comprises an E26 light bulb receptacle.
An embodiment wherein said LDC comprises a TRIAC-based dimmer control.
An embodiment wherein said LDC comprises a TRIAC-based dimmer control incorporating a digital potentiometer gate control.
An embodiment wherein said WCI interfaces to the Internet.
An embodiment wherein said system further comprises a mobile communication device configured to communicate with said WCI.
An embodiment wherein said WCI is configured to communicate with a home automation network (HAN).
An embodiment wherein said WCI is configured to operate as a router within a home automation network (HAN).
An embodiment wherein said WCI is configured to operate as a network bridge between a home automation network (HAN) and an external communication network (ECN).

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A light fixture monitoring/control system/method allowing a lamp associated with a lighting fixture to be controlled in response to localized lighting fixture sensor inputs and/or remote wireless commands has been disclosed. The system utilizes a light fixture adapter (LFA) as a dimming control and monitoring interface between a light fixture and the lamp installed in the LFA. Dimming control is directed by a computing device based on a LFA program (LFAP) that analyzes information from one or more sensors integrated within the LFA. The LFA supports a web-based browser interface and a wireless communication link allowing remote users to define the LFAP and/or directly control lamp dimming and/or access data from LFA sensors. The LFA permits low-cost retrofitting of existing light fixtures with "smart" networked lighting controls that may incorporate advanced spatially diverse security monitoring functions including audio and/or video surveillance.

What is claimed is:
1. A light fixture monitoring/control system comprising a light fixture adapter (LFA) further comprising:
(a) source electrical input connector (SEIC); and
(b) sink electrical output connector (SEOC);
(c) lamp dimmer control (LDC);
(d) integrated computing device (ICD);
(e) light fixture adapter sensor (LFAS); and
(f) wireless communication interface (WCI);
wherein
said LDC is configured to control the flow of electrical current from said SEIC to said SEOC under direction of said ICD;
said ICD is configured to monitor said LFAS;
said ICD is configured to control said LDC in response to inputs from said LFAS;
said ICD is configured to monitor said WCI;
said ICD is configured to control said LDC in response to inputs from said WCI;
said ICD is configured with a web-browser interface permitting remote monitoring of said LFAS via said WCI;
said ICD is configured with a web-browser interface permitting remote control of said LDC via said WCI;
said ICD is configured to execute instructions stored in a lamp fixture adapter program (LFAP);
said LFAP is configured to allow local control and monitoring of said LDC in response to inputs from said LFAS;
said LFAP is configured to allow local control and monitoring of said LFAS in response to inputs from said WCI;
said LFAP is configured to allow said LFAS to be monitored and controlled by said web-browser interface;
said LFAP is configured to allow reporting of LFAS detected events to said WCI;
said LFAP is configured to be remotely programmable via said WCI via said web-browser interface;

said ICD is configured to establish a web-based monitoring and control interface accessible via said WCI;
said ICD is configured to connect to a web-server via said WCI;
said ICD is configured to load said LFAP from said web-server based on a user configuration setup;
said ICD is configured to execute said LFAP instructions to monitor said LFAS and control said LDC;
said ICD is configured to determine if a LFAS event has occurred and report said LFAS event to a web-based remote interface; and
said ICD is configured to execute a dimming instruction protocol on said LDC based on input from said LFAS.

2. The light fixture monitoring/control system of claim 1 wherein said SEIC comprises an E26 light bulb socket.

3. The light fixture monitoring/control system of claim 1 wherein said SEOC comprises an E26 light bulb receptacle.

4. The light fixture monitoring/control system of claim 1 wherein said LDC comprises a TRIAC-based dimmer control.

5. The light fixture monitoring/control system of claim 1 wherein said LDC comprises a TRIAC-based dimmer control incorporating a digital potentiometer gate control.

6. The light fixture monitoring/control system of claim 1 wherein said WCI interfaces to the Internet.

7. The light fixture monitoring/control system of claim 1 wherein said system further comprises a mobile communication device configured to communicate with said WCI.

8. The light fixture monitoring/control system of claim 1 wherein said WCI is configured to communicate with a home automation network (HAN).

9. The light fixture monitoring/control system of claim 1 wherein said WCI is configured to operate as a router within a home automation network (HAN).

10. The light fixture monitoring/control system of claim 1 wherein said WCI is configured to operate as a network bridge between a home automation network (HAN) and an external communication network (ECN).

11. A light fixture monitoring/control method, said method operating in conjunction with a light fixture monitoring/control system comprising a light fixture adapter (LFA) comprising:
(a) source electrical input connector (SEIC); and
(b) sink electrical output connector (SEOC);
(c) lamp dimmer control (LDC);
(d) integrated computing device (ICD);
(e) light fixture adapter sensor (LFAS); and
(f) wireless communication interface (WCI);
wherein
said LDC is configured to control the flow of electrical current from said SEIC to said SEOC under direction of said ICD;
said ICD is configured to monitor said LFAS;
said ICD is configured to control said LDC in response to inputs from said LFAS;
said ICD is configured to monitor said WCI;
said ICD is configured to control said LDC in response to inputs from said WCI;
said ICD is configured with a web-browser interface permitting remote monitoring of said LFAS via said WCI;
said ICD is configured with a web-browser interface permitting remote control of said LDC via said WCI;
said ICD is configured to execute instructions stored in a lamp fixture adapter program (LFAP);
said LFAP is configured to allow local control and monitoring of said LDC in response to inputs from said LFAS;
said LFAP is configured to allow local control and monitoring of said LFAS in response to inputs from said WCI;
said LFAP is configured to allow said LFAS to be monitored and controlled by said web-browser interface;
said LFAP is configured to allow reporting of LFAS detected events to said WCI; and
the LFAP is configured to be remotely programmable via the WCI via the web-browser interface;
wherein the method comprises the steps of:
(1) determining if a computer network is accessible via said WCI, and if not, proceeding to step (5);
(2) connecting to a web-server via said computer network via said WCI;
(3) establishing a web-based monitoring and control interface on said ICD;
(4) loading said LFAP from said web-server based on a user configuration setup;
(5) executing said LFAP instructions on said ICD to monitor said LFAS and control said LDC;
(6) determining if a LFAS event has occurred and if not, proceeding to step (8);
(7) reporting said event and/or sending data to a web-based remote interface;
(8) determining if LDC control is required by a local or remote control instruction, and if not, proceeding to step (1);
(9) executing a dimming instruction protocol on said LDC based on input from said LFAS and proceeding to step (1).

12. The light fixture monitoring/control method of claim 11 wherein said SEIC comprises an E26 light bulb socket.

13. The light fixture monitoring/control method of claim 11 wherein said SEOC comprises an E26 light bulb receptacle.

14. The light fixture monitoring/control method of claim 11 wherein said LDC comprises a TRIAC-based dimmer control.

15. The light fixture monitoring/control method of claim 11 wherein said LDC comprises a TRIAC-based dimmer control incorporating a digital potentiometer gate control.

16. The light fixture monitoring/control method of claim 11 wherein said WCI interfaces to the Internet.

17. The light fixture monitoring/control method of claim 11 wherein said system further comprises a mobile communication device configured to communicate with said WCI.

18. The light fixture monitoring/control method of claim 11 wherein said WCI is configured to communicate with a home automation network (HAN).

19. The light fixture monitoring/control method of claim 11 wherein said WCI is configured to operate as a router within a home automation network (HAN).

20. The light fixture monitoring/control method of claim 11 wherein said WCI is configured to operate as a network bridge between a home automation network (HAN) and an external communication network (ECN).

21. A tangible non-transitory computer usable medium having computer-readable program code means comprising a light fixture monitoring/control method wherein said method controls a light fixture monitoring/control system comprising:
(a) source electrical input connector (SEIC); and
(b) sink electrical output connector (SEOC);
(c) lamp dimmer control (LDC);
(d) integrated computing device (ICD);
(e) light fixture adapter sensor (LFAS); and
(f) wireless communication interface (WCI);

wherein
said LDC is configured to control the flow of electrical current from said SEIC to said SEOC under direction of said ICD;
said ICD is configured to monitor said LFAS;
said ICD is configured to control said LDC in response to inputs from said LFAS;
said ICD is configured to monitor said WCI;
said ICD is configured to control said LDC in response to inputs from said WCI;
said ICD is configured with a web-browser interface permitting remote monitoring of said LFAS via said WCI;
said ICD is configured with a web-browser interface permitting remote control of said LDC via said WCI;
said ICD is configured to execute instructions stored in a lamp fixture adapter program (LFAP);
said LFAP is configured to allow local control and monitoring of said LDC in response to inputs from said LFAS;
said LFAP is configured to allow local control and monitoring of said LFAS in response to inputs from said WCI;
said LFAP is configured to allow said LFAS to be monitored and controlled by said web-browser interface;
said LFAP is configured to allow reporting of LFAS detected events to said WCI; and
the LFAP is configured to be remotely programmable via the WCI via the web-browser interface;
wherein the method comprises the steps of:
(1) determining if a computer network is accessible via said WCI, and if not, proceeding to step (5);
(2) connecting to a web-server via said computer network via said WCI;
(3) establishing a web-based monitoring and control interface on said ICD;
(4) loading said LFAP from said web-server based on a user configuration setup;
(5) executing said LFAP instructions on said ICD to monitor said LFAS and control said LDC;
(6) determining if a LFAS event has occurred and if not, proceeding to step (8);
(7) reporting said event and/or sending data to a web-based remote interface;
(8) determining if LDC control is required by a local or remote control instruction, and if not, proceeding to step (1);
(9) executing a dimming instruction protocol on said LDC based on input from said LFAS and proceeding to step (1).

22. The computer usable medium of claim 21 wherein said SEIC comprises an E26 light bulb socket.

23. The computer usable medium of claim 21 wherein said SEOC comprises an E26 light bulb receptacle.

24. The computer usable medium of claim 21 wherein said LDC comprises a TRIAC-based dimmer control.

25. The computer usable medium of claim 21 wherein said LDC comprises a TRIAC-based dimmer control incorporating a digital potentiometer gate control.

26. The computer usable medium of claim 21 wherein said WCI interfaces to the Internet.

27. The computer usable medium of claim 21 wherein said system further comprises a mobile communication device configured to communicate with said WCI.

28. The computer usable medium of claim 21 wherein said WCI is configured to communicate with a home automation network (HAN).

29. The computer usable medium of claim 21 wherein said WCI is configured to operate as a router within a home automation network (HAN).

30. The computer usable medium of claim 21 wherein said WCI is configured to operate as a network bridge between a home automation network (HAN) and an external communication network (ECN).

* * * * *